United States Patent
Taki

(10) Patent No.: US 12,529,739 B2
(45) Date of Patent: Jan. 20, 2026

(54) pH CALCULATING APPARATUS, MAGNETIC RESONANCE IMAGING APPARATUS, AND pH CALCULATING METHOD

(71) Applicant: CANON MEDICAL SYSTEMS CORPORATION, Otawara (JP)

(72) Inventor: Sotaro Taki, Utsunomiya (JP)

(73) Assignee: CANON MEDICAL SYSTEMS CORPORATION, Otawara (JP)

( * ) Notice: Subject to any disclaimer, the term of this patent is extended or adjusted under 35 U.S.C. 154(b) by 272 days.

(21) Appl. No.: 18/347,735

(22) Filed: Jul. 6, 2023

(65) Prior Publication Data

US 2024/0036134 A1 Feb. 1, 2024

(30) Foreign Application Priority Data

Jul. 26, 2022 (JP) .................................. 2022-118373
Jun. 20, 2023 (JP) .................................. 2023-100439

(51) Int. Cl.
  *G01R 33/48* (2006.01)
  *A61B 5/055* (2006.01)
  *G01R 33/56* (2006.01)

(52) U.S. Cl.
  CPC .......... *G01R 33/4804* (2013.01); *A61B 5/055* (2013.01); *G01R 33/5601* (2013.01)

(58) Field of Classification Search
  None
  See application file for complete search history.

(56) References Cited

U.S. PATENT DOCUMENTS 8,518,373 B2 * 8/2013 Aime ...................... A61K 49/10
424/9.3
10,328,162 B1   6/2019 Aime et al.
(Continued)

FOREIGN PATENT DOCUMENTS

EP    2 457 594 A1    5/2012
JP    2019-505248 A   2/2019

OTHER PUBLICATIONS

Extended European Search Report issued Dec. 4, 2023 in European Patent Application No. 23187100.5, 12 pages.
(Continued)

*Primary Examiner* — Rodney E Fuller
(74) *Attorney, Agent, or Firm* — Oblon, McClelland, Maier & Neustadt, L.L.P.

(57) ABSTRACT

A pH calculating apparatus according to an embodiment includes processing circuitry that obtains a Z spectrum generated from a CEST imaging process by using, for a subject, a contrast agent containing types of substances having mutually-different responsiveness to pH during chemical shift imaging and including fall points of signal values corresponding to the types of substances; obtains information related to the subject; calculates a pH dependent value by using MR signal values corresponding to the fall points of the signal values; selects a standard curve indicating a pH value corresponding to the pH dependent value in accordance with the information, from among standard curves prepared in advance in accordance with the information; and determines a pH value based on the selected standard curve and the pH dependent value.

14 Claims, 9 Drawing Sheets

(56) References Cited

U.S. PATENT DOCUMENTS

| | | | | |
|---|---|---|---|---|
| 2008/0188738 | A1* | 8/2008 | Wegh | G01R 33/4804 |
| | | | | 600/420 |
| 2009/0196830 | A1* | 8/2009 | Lamerichs | A61K 49/0002 |
| | | | | 424/9.3 |
| 2012/0019245 | A1* | 1/2012 | Reddy | G01R 33/5601 |
| | | | | 324/309 |
| 2013/0195768 | A1 | 8/2013 | Aime et al. | |
| 2015/0323632 | A1* | 11/2015 | Sun | G01R 33/5601 |
| | | | | 324/309 |
| 2020/0309885 | A1* | 10/2020 | Wu | G01R 33/5605 |
| 2020/0379070 | A1 | 12/2020 | Aime et al. | |
| 2021/0263122 | A1 | 8/2021 | Aime et al. | |

OTHER PUBLICATIONS

Ma et al., "AcidoCEST-UTE MRI for the Assessment of Extracellular pH of Joint Tissues at 3 T", Investigative Radiology, vol. 54, No. 9, Sep. 1, 2020, 16 pages.

Liu et al., "Nuts and Bolts of Chemical exchange saturation Transfer MRI", NMR in Biomedicine, vol. 26. No. 7, Jan. 10, 2013, pp. 810-828.

Carradus et al., "Measuring the pH of human blood using CEST", Proceedings of the International Society for Magnetic Resonance in Medicine, Np, 3998, Apr. 26, 2019, 2 pages.

Ward et al., "Determination of pH Using Water Protons and Chemical Exchange Dependent Saturation Transfer (CEST)", Magnetic Resonance in Medicine, vol. 44, 2000, 4 pages.

\* cited by examiner

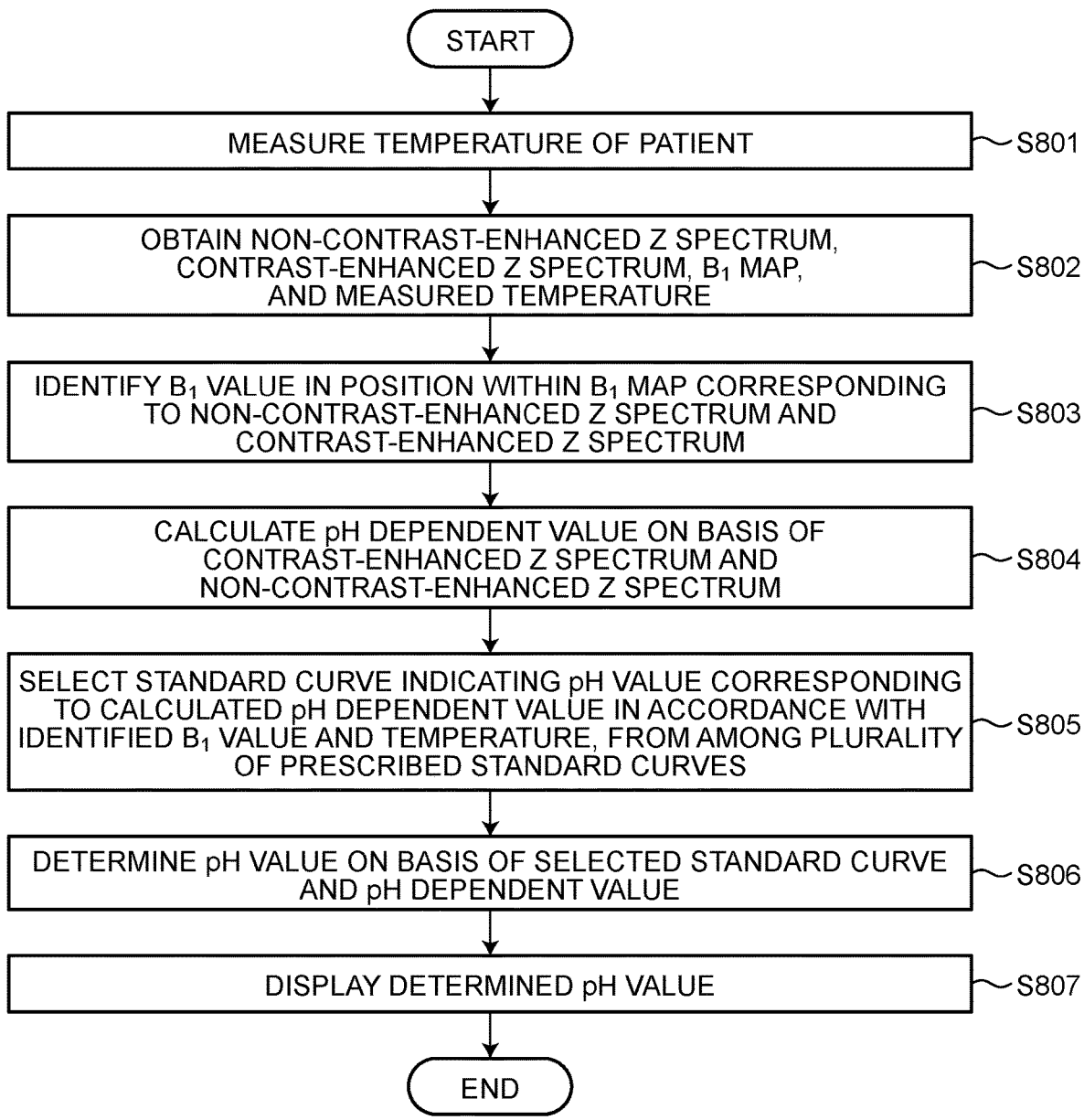

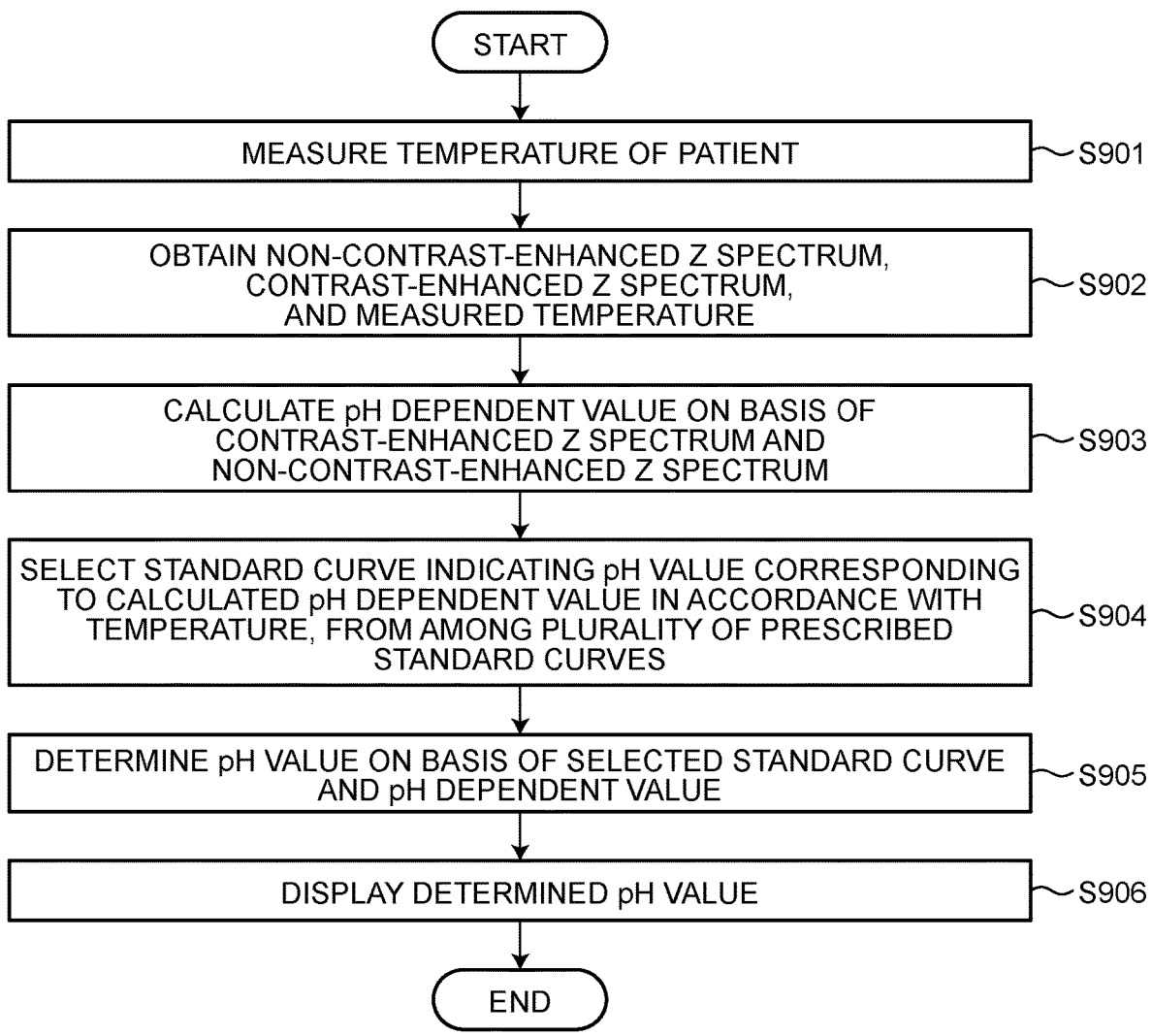

pH CALCULATING APPARATUS, MAGNETIC RESONANCE IMAGING APPARATUS, AND pH CALCULATING METHOD

CROSS-REFERENCE TO RELATED APPLICATIONS

This application is based upon and claims the benefit of priority from Japanese Patent Application No. 2022-118373, filed on Jul. 26, 2022; and Japanese Patent Application No. 2023-100439, filed on Jun. 20, 2023, the entire contents of both of which are incorporated herein by reference.

FIELD

Embodiments described herein relate generally to a pH calculating apparatus, a magnetic resonance imaging apparatus, and a pH calculating method.

BACKGROUND

As a conventional technique, an imaging method based on Magnetic Resonance Imaging (MRI) using Chemical Exchange Saturation Transfer (hereinafter, "CEST") has been proposed. Solute protons dissolved in water are chemically exchanged with water protons. The speed of such a chemical exchange is dependent on temperature and pH. Further, resonance frequencies of protons vary depending on the state of the protons. Such changes in the resonance frequencies of protons are called "chemical shifts". For these reasons, when a saturation Radio Frequency (RF) pulse set to a frequency specific to solute protons is transmitted, a phenomenon occurs where water protons, which are not supposed to be saturated, are in a saturated state. This phenomenon is called Chemical Exchange Saturation Transfer (CEST). Imaging methods using the CEST phenomenon are called CEST imaging. In those situations, a substance (a CEST substance) that realizes the CEST phenomenon is used in CEST imaging.

As explained above, the CEST phenomenon reflects properties of substances such as temperatures and pH. For this reason, for example, by combining a CEST substance having two proton pools and a method called ratiometric method, it is possible to perform pH imaging by which pH is imaged without being dependent on the concentration of the CEST substance. However, the pH calculation using the ratiometric method has a constraint where the intensity (hereinafter, "executed saturation pulse intensity") of a saturation pulse executed in the CEST imaging and temperature need to be constant, or the like. In a patient's body, temperature is approximately 37° C., which is considered to be constant. However, the executed saturation pulse intensity may not necessarily be constant during the CEST imaging in some situations. Consequently, there is a possibility that calculated pH values may not always be accurate.

BRIEF DESCRIPTION OF THE DRAWINGS

FIG. 8 is a flowchart illustrating an example of a procedure in a pH value determining process according to the third embodiment; and FIG. 9 is a flowchart illustrating an example of a procedure in a pH value determining process according to a fourth embodiment.

DETAILED DESCRIPTION

Figure 1:
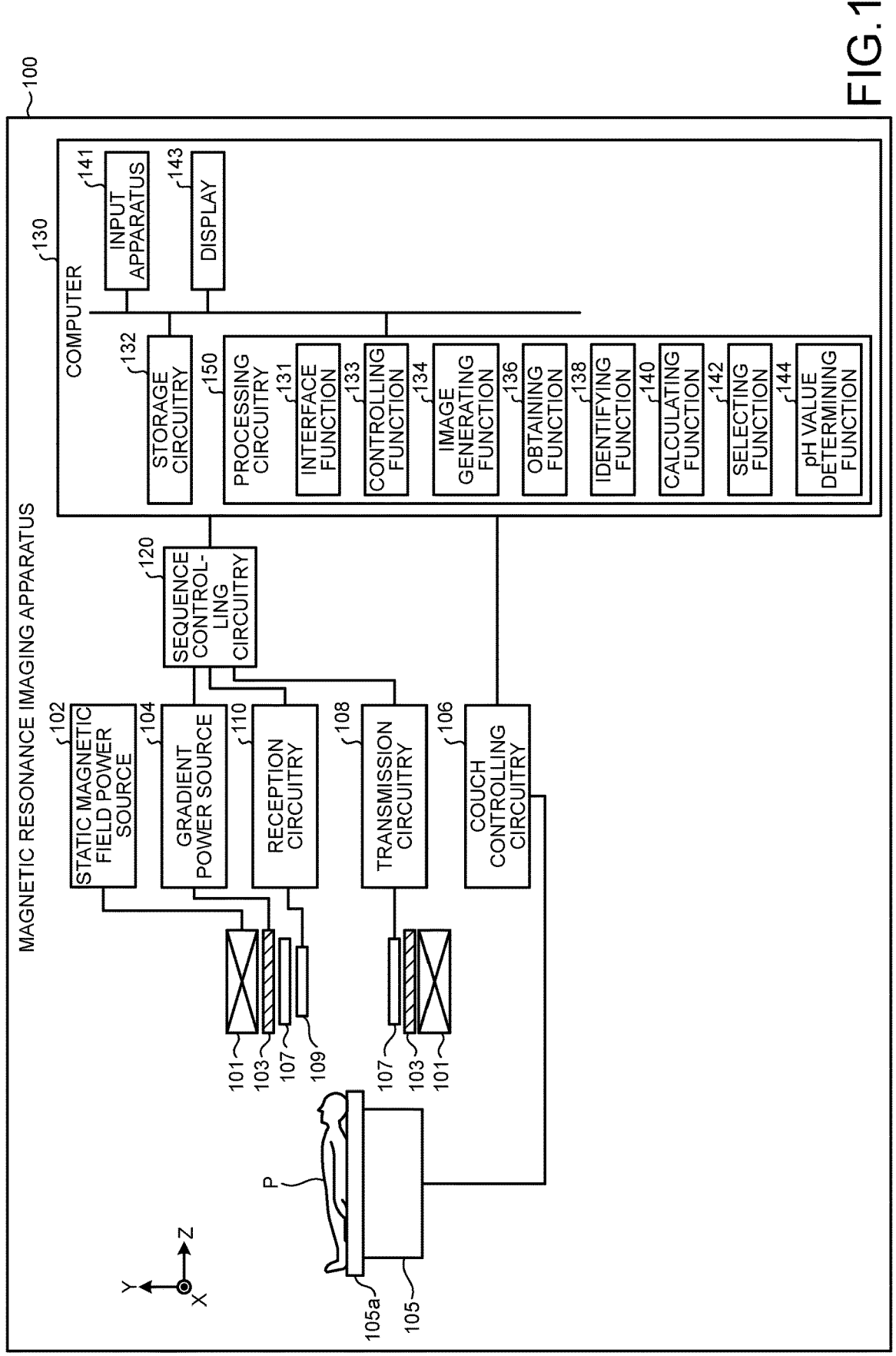
FIG. 1 is a block diagram illustrating a configuration of an MRI apparatus according to a first embodiment.

One of the problems to be solved by the embodiments disclosed in the present specification and drawings is to enhance accuracy (precision levels) of calculated pH values. However, problems to be solved by the embodiments disclosed in the present specification and drawings are not limited to the abovementioned problem. It is also possible to consider problems corresponding to advantageous effects achieved by the configurations in the embodiments described below as other problems.

A pH calculating apparatus according to an embodiment includes processing circuitry. The processing circuitry is configured: to obtain at least one Z spectrum that is generated from a Chemical Exchange Saturation Transfer (CEST) imaging process by using, for an examined subject, a contrast agent containing a plurality of types of substances having mutually-different responsiveness to pH during chemical shift imaging and that includes fall points of a plurality of signal values respectively corresponding to the plurality of types of substances, and to also obtain information related to the examined subject. The processing circuitry is configured to calculate a pH dependent value by using a plurality of MR signal values corresponding to the fall points of the plurality of signal values. The processing circuitry is configured to select a standard curve indicating a pH value corresponding to the pH dependent value in accordance with the information related to the examined subject, from among a plurality of standard curves prepared in advance in accordance with the information related to the examined subject. The processing circuitry is configured to determine a pH value on the basis of the selected standard curve and the pH dependent value.

Exemplary embodiments of a pH calculating apparatus, a Magnetic Resonance Imaging apparatus (hereinafter, "MRI apparatus") having the pH calculating apparatus installed therein, and a pH calculating method will be explained below, with reference to the drawings. Possible embodiments are not limited to the embodiments described below. Further, the description of each of the embodiments is, in principle, similarly applicable to any other embodiment. In the following embodiments, some of the elements referred to by using the same reference characters are assumed to perform the same operations, and duplicate explanations thereof will be omitted as appropriate.

First Embodiment

FIG. 1 is a block diagram illustrating a configuration of an MRI apparatus 100 according to a first embodiment. As illustrated in FIG. 1, the MRI apparatus 100 includes a static magnetic field magnet 101, a static magnetic field power source 102, a gradient coil 103, a gradient power source 104, a couch 105, couch controlling circuitry 106, a transmission coil 107, transmission circuitry 108, a reception coil 109, reception circuitry 110, sequence controlling circuitry 120, and a computer 130 (which may be referred to as an image processing apparatus). The MRI apparatus 100 does not include an examined subject (hereinafter, "patient") P (e.g., a human body). Further, the configuration illustrated in FIG. 1 is merely an example. For example, it is acceptable to configure any of the functional units in the sequence controlling circuitry 120 and the computer 130 so as to be integrated or separated, as appropriate.

The static magnetic field magnet 101 is a magnet formed to have a hollow and substantially circular cylindrical shape and is configured to generate a static magnetic field in the space inside thereof. For example, the static magnetic field magnet 101 is a superconductive magnet or the like and is configured to excite magnetism by receiving a supply of an electric current from the static magnetic field power source 102. The static magnetic field power source 102 is configured to supply the electric current to the static magnetic field magnet 101. In another example, the static magnetic field magnet 101 may be a permanent magnet, and in that situation, the MRI apparatus 100 does not need to include the static magnetic field power source 102. Further, the static magnetic field power source 102 may be provided separately from the MRI apparatus 100.

The gradient coil 103 is a coil formed so as to have a hollow substantially circular cylindrical shape and is arranged on the inside of the static magnetic field magnet 101. The gradient coil 103 is formed by combining together three coils corresponding to X-, Y-, and Z-axes orthogonal to one another. By individually receiving a supply of an electric current from the gradient power source 104, the three coils are configured to generate gradient magnetic fields of which magnetic field intensities change along the X-, Y-, and Z-axes. The gradient magnetic fields generated along the X-, Y-, and Z-axes by the gradient coil 103 are, for example, a slice gradient magnetic field Gs, a phase encoding gradient magnetic field Ge, and a read-out gradient magnetic field Gr. The gradient power source 104 is configured to supply the electric currents to the gradient coil 103.

The couch 105 includes a couchtop 105a on which the patient P is placed and is configured, under control of the couch controlling circuitry 106, to insert the couchtop 105a into the hollow (an image taking opening) of the gradient coil 103, while the patient P is placed thereon. Usually, the couch 105 is installed so that the longitudinal direction thereof is parallel to the central axis of the static magnetic field magnet 101. Under control of the computer 130, the couch controlling circuitry 106 is configured to drive the couch 105, so as to move the couchtop 105a in longitudinal directions and up-and-down directions.

The transmission coil 107 is arranged on the inside of the gradient coil 103 and is configured to generate a radio frequency magnetic field by receiving a supply of a Radio Frequency (RF) pulse from the transmission circuitry 108. The transmission circuitry 108 is configured to supply the RF pulse corresponding to a Larmor frequency determined by the type of targeted atoms and the magnetic field intensity, to the transmission coil 107.

The reception coil 109 is arranged on the inside of the gradient coil 103 and is configured to receive a magnetic resonance signal (hereinafter, "Magnetic Resonance (MR) signal") emitted from the patient P due to influence of the radio frequency magnetic field. Upon receipt of the MR signal, the reception coil 109 is configured to output the received MR signal to the reception circuitry 110.

The transmission coil 107 and the reception coil 109 described above are merely examples. It is possible to configure the transmission coil 107 and the reception coil 109 by selecting one or combining two or more from among: a coil having only the transmitting function; a coil having only the receiving function; and a coil having the transmitting and receiving functions.

The reception circuitry 110 is configured to detect the MR signal output from the reception coil 109 and to generate MR data on the basis of the detected MR signal. More specifically, the reception circuitry 110 is configured to generate the MR data by performing a digital conversion on the MR signal output from the reception coil 109. Further, the reception circuitry 110 is configured to transmit the generated MR data to the sequence controlling circuitry 120. Alternatively, the reception circuitry 110 may be provided for a gantry apparatus which includes the static magnetic field magnet 101, the gradient coil 103, and the like.

The sequence controlling circuitry 120 is configured to perform an imaging process on the patient P, by driving the gradient power source 104, the transmission circuitry 108, and the reception circuitry 110, on the basis of sequence information transmitted from the computer 130. In this situation, the sequence information is information defining a procedure for performing the imaging process and may be referred to as a sequence condition. The sequence information defines: the magnitude of the electric current to be supplied to the gradient coil 103 by the gradient power source 104 and the timing with which the electric current is to be supplied; the intensity of the RF pulse to be supplied to the transmission coil 107 by the transmission circuitry 108 and the timing with which the RF pulse is to be applied; the timing with which the MR signal is to be detected by the reception circuitry 110; and the like.

For example, the sequence controlling circuitry 120 may be integrated circuitry such as an Application Specific Integrated Circuit (ASIC) or a Field Programmable Gate Array (FPGA) or may be electronic circuitry such as a Central Processing Unit (CPU) or a Micro Processing Unit (MPU). The sequence controlling circuitry 120 corresponds to a sequence controlling unit. For example, the sequence controlling circuitry 120 is configured to perform an imaging process (e.g., map imaging explained later) different from a CEST imaging process (explained later) and the CEST imaging process.

Further, upon receipt of the MR data from the reception circuitry 110 as a result of imaging the patient P by driving the gradient power source 104, the transmission circuitry 108, and the reception circuitry 110, the sequence controlling circuitry 120 is configured to transfer the received MR data to the computer 130.

The computer 130 is configured to control the entirety of the MRI apparatus 100, to generate images, and the like. The computer 130 includes storage circuitry 132, an input apparatus 141, a display 143, and processing circuitry 150. The processing circuitry 150 includes an interface function 131, a controlling function 133, an image generating function 134, an obtaining function 136, an identifying function 138, a calculating function 140, a selecting function 142, and a pH value determining function 144.

Processing functions performed by the interface function 131, the controlling function 133, the image generating function 134, the obtaining function 136, the identifying function 138, the calculating function 140, the selecting function 142, and the pH value determining function 144 are stored in the storage circuitry 132 in the form of computer-executable programs. The processing circuitry 150 is a processor configured to realize the functions corresponding to the programs by reading and executing the programs from the storage circuitry 132. In other words, the processing circuitry 150 that has read the programs has the functions illustrated within the processing circuitry 150 in FIG. 1.

Further, although the example was explained with reference to FIG. 1 in which the single piece of processing circuitry (i.e., the processing circuitry 150) realizes the processing functions performed by the interface function 131, the controlling function 133, the image generating function 134, the obtaining function 136, the identifying function 138, the calculating function 140, the selecting function 142, and the pH value determining function 144, it is also acceptable to structure the processing circuitry 150 by combining together a plurality of independent processors, so that the functions are realized as a result of the processors executing the programs. In other words, each of the above-mentioned functions may be structured as a program, so that the single piece of processing circuitry (i.e., the processing circuitry 150) is configured to execute the programs. Alternatively, one or more specific functions may be installed in dedicated and independent program executing circuitry.

The term "processor" used in the above explanations denotes, for example, a CPU, a Graphical Processing Unit (GPU), or circuitry such as application specific integrated circuitry or a programmable logic device (e.g., a Simple Programmable Logic Device (SPLD), a Complex Programmable Logic Device (CPLD), or a Field Programmable Gate Array (FPGA)). The one or more processors are configured to realize the functions by reading and executing the programs saved in the storage circuitry 132.

Alternatively, instead of having the programs saved in the storage circuitry 132, it is also acceptable to directly incorporate the programs in the circuitry of the one or more processors. In that situation, the one or more processors realize the functions by reading and executing the programs incorporated in the circuitry thereof. Similarly, the couch controlling circuitry 106, the transmission circuitry 108, the reception circuitry 110, and the like are also configured by using electronic circuitry such as the processor described above.

By employing the interface function 131, the processing circuitry 150 is configured to transmit the sequence information to the sequence controlling circuitry 120 and to receive the MR data from the sequence controlling circuitry 120. Further, upon receipt of the MR data, the processing circuitry 150 including the interface function 131 is configured to store the received MR data into the storage circuitry 132. The processing circuitry 150 realizing the interface function 131 corresponds to an interface unit. Other functions of the processing circuitry 150 will be explained later.

The storage circuitry 132 is configured to store therein the MR data received by the processing circuitry 150 including the interface function 131, various types of data obtained by the obtaining function 136, various types of image data generated by the image generating function 134, calculating processes used by the calculating function 140, pH dependent values calculated in the calculating processes, a plurality of standard curves used by the selecting function 142, a pH value determined by the pH value determining function 144, and the like. Each of the plurality of standard curves indicates pH values corresponding to pH dependent values. The standard curves vary depending on a plurality of $B_1$ values. The storage circuitry 132 is configured to store therein the plurality of standard curves kept in correspondence with the plurality of $B_1$ values, by using the format of a plurality of correspondence tables (Lookup Tables (LUTs)), for example.

The plurality of standard curves are prepared in advance, for example, on the basis of actual measurement values measured in advance by using a phantom or the like and are stored in the storage circuitry 132. The actual measurement values are, for example, $B_1$ values, pH dependent values, pH values, and/or the like. The plurality of standard curves may be represented by data based on actual measuring processes, data calculated from a simulation, or data obtained by interpolating the actual measurement values and may be data prepared in advance. In the present embodiment, the interpolation denotes calculating a standard curve by interpolating two adjacent $B_1$ values.

Further, the storage circuitry 132 is configured to store therein MR data (which may be referred to as "k-space data") arranged in a k-space by the controlling function 133. Various types of data stored therein including the above will be explained later. For example, the storage circuitry 132 is realized by using a semiconductor memory element such as a Random Access Memory (RAN) or a flash memory, or a hard disk, an optical disk, or the like.

The input apparatus 141 is configured to receive various types of instructions and inputs of information from a user. The input apparatus 141 is realized by using, for example, a trackball, a switch button, a mouse, a keyboard, a touchpad on which input operations can be performed by touching an operation surface thereof, a touch screen in which a display screen and a touchpad are integrally formed, contactless input circuitry using an optical sensor, audio input circuitry, and/or the like. The input apparatus 141 is electrically connected to the processing circuitry 150 and is configured to convert an input operation received from an operator into an electrical signal and to output the electrical signal to the processing circuitry 150.

In the present disclosure, the input apparatus 141 does not necessarily have to include physical operation component parts (input interfaces) such as a mouse, a keyboard, and/or the like. For instance, possible examples of the input apparatus 141 include electrical signal processing circuitry configured to receive an electrical signal corresponding to an input operation from an external input mechanism provided separately from the MRI apparatus 100 and to output the electrical signal to controlling circuitry.

Under control of the processing circuitry 150 including the controlling function 133, the display 143 is configured to display a Graphical User Interface (GUI) used for receiving an input of image taking conditions, an image generated by the processing circuitry 150 including the image generating function 134, and the like. For example, the display 143 is realized by using a display mechanism such as a Cathode Ray tube (CRT) display, a liquid crystal display, an organic electroluminescence (EL) display, a Light Emitting Diode (LED) display, a plasma display, or other arbitrary displays and monitors known in the relevant technical field.

A Chemical Exchange Saturation Transfer (CEST) effect related to the present embodiment will briefly be explained. Protons in free water (bulk water) are exchanged with compound protons. For example, compound protons such as those in an amide group (—NH), a hydroxyl group (—OH), or an amino group (—NH2) are exchangeable protons. The CEST effect can be described by using a quantity called a "Z spectrum" or an "MTRasym spectrum". Imaging processes related to the CEST effect are based on an MR imaging method (hereinafter, "CEST imaging") that utilizes the phenomenon in which protons in an amide group (—NH), a hydroxyl group (—OH), or an amino group (—NH2) are exchanged with protons in free water.

According to a magnetic resonance imaging method (hereinafter, "CEST imaging process") related to the CEST effect, the sequence controlling circuitry 120 is configured to apply, to the patient P, a saturation pulse which is a frequency-selective Radio Frequency (RF) pulse prior to acquiring an MR signal, at a frequency (an off-resonance frequency) that is apart from the resonance frequency of free water and is equal to a resonance frequency of exchangeable protons (e.g., compound protons). The saturation pulse may be referred to as a pre-saturation pulse. More specifically, the CEST imaging process implements a magnetic resonance imaging method by which a plurality of saturation pulses are applied, and a plurality of magnetic resonance signals (MR signals) corresponding to the plurality of saturation pulses are acquired.

Figure 2:
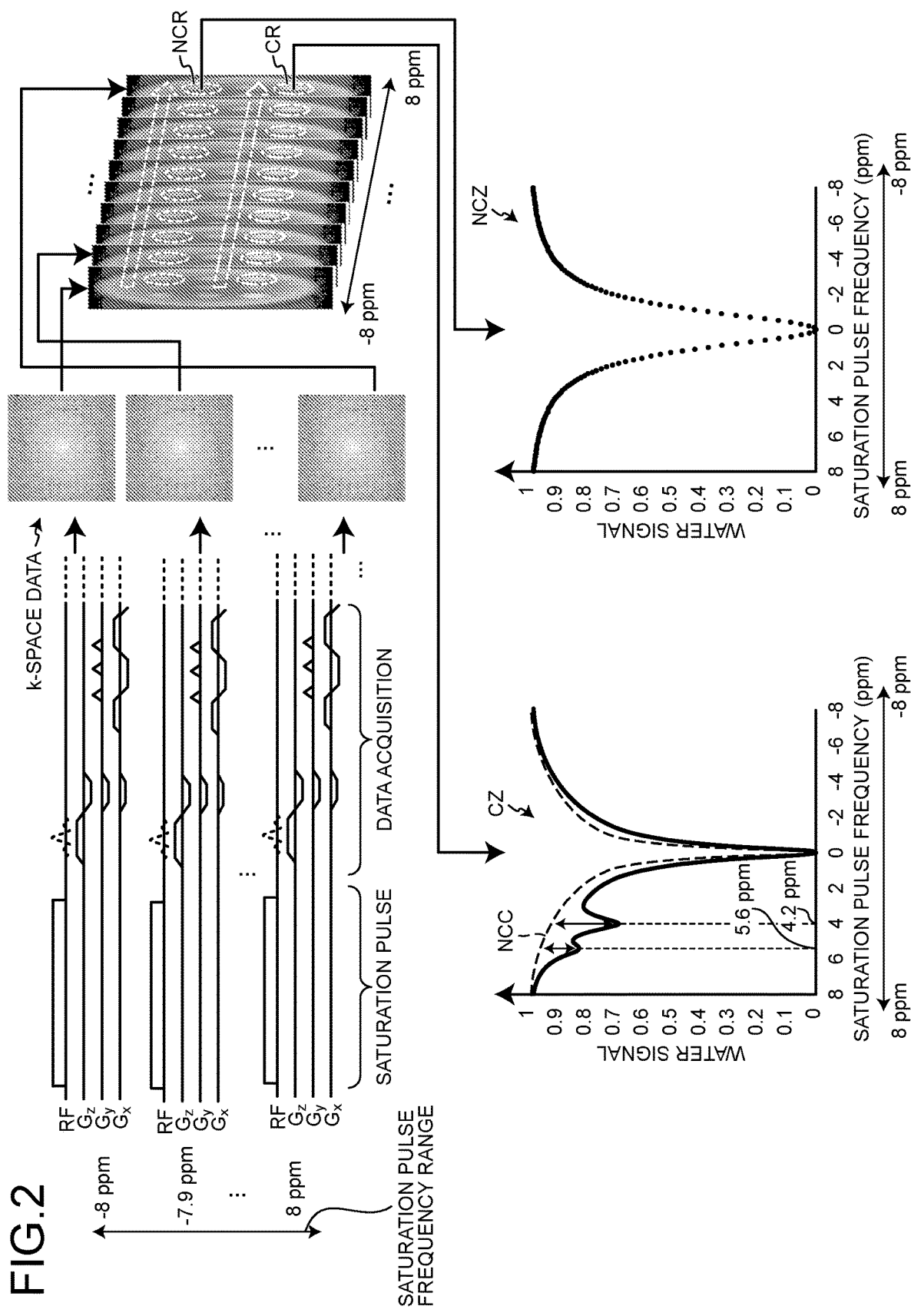
FIG. 2 is a schematic drawing according to the first embodiment illustrating an example of an outline related to CEST imaging using a contrast agent.

The CEST imaging related to the present embodiment will be explained, with reference to FIG. 2. FIG. 2 is a schematic drawing illustrating an example of an outline related to the CEST imaging using a contrast agent. The contrast agent contains a plurality of types of substances having mutually-different responsiveness to pH during chemical shift imaging. In the following sections, to explain a specific example, the contrast agent will be assumed to be iopamidol. In this situation, the plurality of types of substances having the mutually-different responsiveness to pH during chemical shift imaging are represented by two types of substances, namely, two amide groups corresponding to a 4.2-ppm chemical shift and one amide group corresponding to a 5.6-ppm chemical shift. Further, the contrast agent does not necessarily need to be iopamidol and may be iopromide, for example.

In the following sections, to explain a specific example, it will be assumed that the frequencies of the plurality of saturation pulses used in the CEST imaging fall in the range from −8 ppm to 8 ppm and are in increments of 0.1 ppm. For example, when the static magnetic field intensity is 3 T, the frequency of a saturation pulse corresponding to 0 ppm is equal to the resonance frequency (hereinafter, "center frequency") of free water based on the static magnetic field intensity, which is 128 MHz. In this situation, the frequency of a saturation pulse corresponding to +8 ppm is calculated as (128 MHz+128×8 Hz). Further, the frequency of a saturation pulse corresponding to −8 ppm is calculated as (128 MHz−128×8 Hz).

As illustrated in FIG. 2, from the CEST imaging, an MR image is obtained by applying the plurality of saturation pulses ranging from −8 ppm to 8 ppm in increments of 0.1 ppm, while the center frequency is 0 ppm. On the basis of 161 MR images, a Z spectrum is generated, which indicates a correction of $B_0$ (the static magnetic field) non-uniformity and impacts of the Chemical Exchange Saturation Transfer (CEST) effect in an accurate chemical shift after the correction.

In FIG. 2, a region NCR denotes a region (hereinafter, "non-contrast-enhanced Region of Interest (ROI)") in which the contrast is not enhanced by the contrast agent. In a Z spectrum NCZ in the non-contrast-enhanced ROI, a fall of the MR signal occurs in a predetermined frequency range centered on the frequency (0 ppm) of the saturation pulse. Further, a region CR illustrated in FIG. 2 denotes a region (hereinafter, "contrast-enhanced ROI") in which the contrast is enhanced by the contrast agent. Another Z spectrum CZ illustrated in FIG. 2 denotes a Z spectrum (hereinafter, "contrast-enhanced Z spectrum") generated from CEST imaging (hereinafter, "contrast-enhanced CEST imaging") using the contrast agent containing a plurality of types of substances having mutually-different responsiveness to pH during chemical shift imaging. In the Z spectrum CZ in the contrast-enhanced ROI, falls of the MR signal occurs in the positions at 4.2 ppm and 5.6 ppm, in addition to in the predetermined frequency range centered on the frequency (0 ppm) of the saturation pulse.

In FIG. 2, a dotted line NCC of the contrast-enhanced Z spectrum CZ related to the contrast-enhanced ROI indicates a Z spectrum (hereinafter, "non-contrast-enhanced Z spectrum") generated by performing CEST imaging (hereinafter, "non-contrast-enhanced CEST imaging") without using a contrast agent on the same ROI as the contrast-enhanced ROI. As illustrated in FIG. 2, differences between the Z spectrum CZ related to the contrast-enhanced ROI and the dotted line NCC are indicated by the bidirectional arrows. With respect to the Z spectrum CZ related to the contrast-enhanced ROI, the bidirectional arrows in the positions at 4.2 ppm and 5.6 ppm indicate the falls of the signal value corresponding to the two type of amide groups in iopamidol being a component of the contrast agent. When iopamidol is used as a contrast agent containing a plurality of types of substances having mutually-different responsiveness to pH during chemical shift imaging, a pH dependent value is calculated by the calculating function 140, while using components of the signal value falls in the positions at 4.2 ppm and 5.6 ppm illustrated in FIG. 2.

Figure 3:
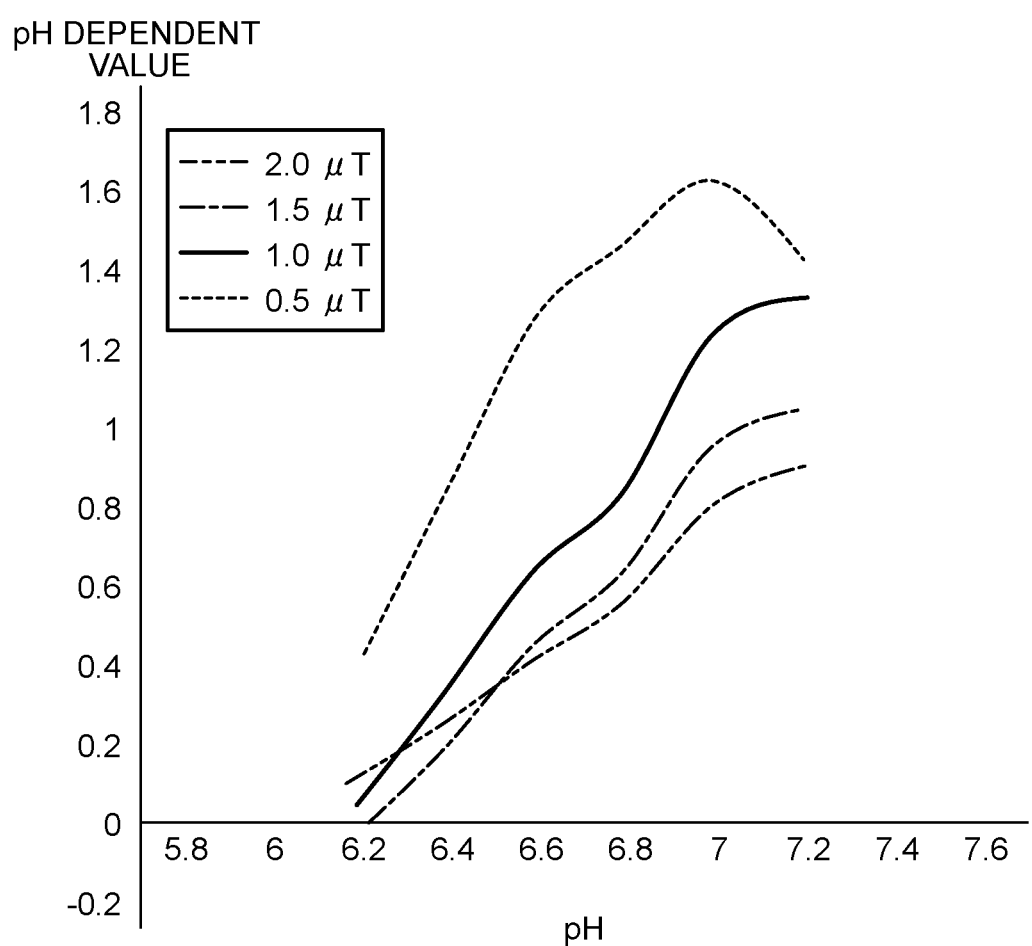
FIG. 3 is a chart according to the first embodiment illustrating examples of a plurality of standard curves corresponding to $B_1$ values.

FIG. 3 is a chart illustrating examples of a plurality of standard curves corresponding to $B_1$ values. The standard curves may be referred to as calibration curves. The $B_1$ values are values that are expressed in the units of microtesla (μT) and each indicate, for example, a difference calculated by using the intensity of an RF pulse set in the sequence information as a reference level. In other words, the $B_1$ values are obtained by emitting an RF pulse onto the patient P. Accordingly, the $B_1$ values correspond to information obtained from the patient P. As illustrated in FIG. 3, each of the plurality of standard curves indicates pH values corresponding to pH dependent values. Each of the plurality of standard curves is determined by using pH dependent values calculated by imaging a phantom having known pH levels and the pH levels and is stored in advance in the storage circuitry 132. A process of generating a $B_1$ map in which the $B_1$ values are arranged throughout an imaged region will be explained later.

As illustrated in FIG. 3, in a coordinate system in which the vertical axis expresses the pH dependent values, whereas the horizontal axis expresses the pH values, the slopes of the standard curves decrease, as the $B_1$ values increase. Conversely, the slopes of the standard curves increase, as the $B_1$ values decrease. Although FIG. 3 illustrates four standard curves corresponding to four $B_1$ values, the quantity of the standard curves stored in the storage circuitry 132 is not limited to four. Further, although FIG. 3 illustrates the plurality of $B_1$ values related to the plurality of standard curves at regular intervals of 0.5 μT, the intervals between the plurality of $B_1$ values may be irregular.

By employing the controlling function 133, the processing circuitry 150 is configured to exercise overall control of the MRI apparatus 100, such as controlling imaging processes, image generating processes, image display processes, and the like. For example, the processing circuitry 150 including the controlling function 133 is configured to receive, through the GUI, an input of the image taking conditions (e.g., an imaging parameter, etc.) and to generate the sequence information according to a saturation pulse condition being set on the basis of the received image taking conditions. Further, the processing circuitry 150 including the controlling function 133 is configured to transmit the generated sequence information to the sequence controlling circuitry 120. The processing circuitry 150 realizing the controlling function 133 corresponds to a controlling unit. In the present embodiment, the controlling function 133 is configured to transmit, to the sequence controlling circuitry 120, sequence information for non-contrast-enhanced CEST imaging, sequence information for an MR imaging process (hereinafter, "map imaging") to acquire MR data related to generation of a $B_0$ map and a $B_1$ map, and sequence information for contrast-enhanced CEST imaging.

By employing the image generating function 134, the processing circuitry 150 is configured to generate an image by reading k-space data from the storage circuitry 132 and performing a reconstructing process such as a Fourier transform on the read k-space data. For example, on the basis of the MR data (hereinafter, "map MR data") acquired from the map imaging, the image generating function 134 is configured to generate the $B_0$ map and the $B_1$ map. The $B_0$ map is a map indicating non-uniformity of the static magnetic field ($B_0$) in the imaged region. The $B_1$ map is a map in which the $B_1$ values are arranged throughout the imaged region. The $B_1$ map indicates non-uniformity of the intensity of the saturation pulse (which may be referred to as "executed saturation pulse intensity") in the imaged region. Because it is possible to generate the $B_0$ map and the $B_1$ map by using known methods as appropriate, explanations thereof will be omitted.

By employing the image generating function 134, the processing circuitry 150 is configured to generate a plurality of MR images (hereinafter, "non-contrast-enhanced MR images"), on the basis of MR data (hereinafter, "non-contrast-enhanced data") acquired from the non-contrast-enhanced CEST imaging. On the basis of the plurality of non-contrast-enhanced MR images and the $B_0$ map, the image generating function 134 is configured to generate a non-contrast-enhanced Z spectrum, with a correction (hereinafter, "$B_0$ correction") of saturation pulse positions. Alternatively, a $B_0$ correction process may be performed on the non-contrast-enhanced MR images. In that situation, the image generating function 134 is configured to generate a non-contrast-enhanced Z spectrum on the basis of the plurality of non-contrast-enhanced MR images on which the $B_0$ correction has been made.

By employing the image generating function 134, the processing circuitry 150 is configured to generate a plurality of MR images (hereinafter, "contrast-enhanced MR images"), on the basis of MR data (hereinafter, "contrast-enhanced data") acquired from the contrast-enhanced CEST imaging. On the basis of the plurality of contrast-enhanced MR images and the $B_0$ map, the image generating function 134 is configured to generate a contrast-enhanced Z spectrum, with a $B_0$ correction. Alternatively, a $B_0$ correction process may be performed on the contrast-enhanced MR images. In that situation, the image generating function 134 is configured to generate a contrast-enhanced Z spectrum on the basis of the plurality of contrast-enhanced MR images on which the $B_0$ correction has been made. As described herein, the Z spectrum according to the embodiment is represented by spectrum data in which the saturation pulse positions in the CEST imaging process have been corrected on the basis of the $B_0$ map generated from the mutually-different imaging processes. The processing circuitry 150 realizing the image generating function 134 corresponds to an image generating unit.

By employing the obtaining function 136, the processing circuitry 150 is configured to obtain at least one Z spectrum that is generated from the CEST imaging process by using the contrast agent containing the plurality of types of substances having the mutually-different responsiveness to pH during chemical shift imaging and that includes the fall points (or local minima) of the plurality of signal values respectively corresponding to the plurality of types of substances and configured to also obtain the information related to the patient P. In the present embodiment, the information related to the patient P is the $B_1$ map, for example. In other words, the $B_1$ map is the information obtained from the patient P. In that situation, the obtaining function 136 is configured to obtain at least one Z spectrum and the $B_1$ map. More specifically, the obtaining function 136 is configured to obtain, for example, the non-contrast-enhanced Z spectrum, the contrast-enhanced Z spectrum, and the $B_1$ map from the image generating function 134. Among the information related to the patient P, information other than the $B_1$ map will be explained in a third embodiment.

When the processing circuitry 150 is installed in a pH calculating apparatus or the like separate from the MRI apparatus 100, the processing circuitry 150 is configured, by employing the obtaining function 136, to obtain the non-contrast-enhanced Z spectrum, the contrast-enhanced Z spectrum, and the $B_1$ map from another MRI apparatus, for example. In that situation also, the contrast-enhanced Z spectrum and the non-contrast-enhanced Z spectrum are Z spectra on which the $B_0$ correction process using the $B_0$ map has been performed. The processing circuitry 150 realizing the obtaining function 136 corresponds to an obtaining unit.

By employing the identifying function 138, the processing circuitry 150 is configured to identify a $B_1$ value in a position within the $B_1$ map corresponding to the Z spectra. More specifically, the identifying function 138 is configured to identify positions within the $B_1$ map in which the contrast-enhanced Z spectrum and the non-contrast-enhanced Z spectrum were generated and to identify the $B_1$ values in the identified positions. For example, when one contrast-enhanced Z spectrum and one non-contrast-enhanced Z spectrum are generated with respect to the contrast-enhanced ROI illustrated in FIG. 2, the identifying function 138 is configured to identify the positions of a plurality of pixels included in the contrast-enhanced ROI. Subsequently, the identifying function 138 is configured to identify the $B_1$ value corresponding to the contrast-enhanced Z spectrum and the non-contrast-enhanced Z spectrum, by calculating an average of a plurality of $B_1$ values corresponding to the identified plurality of pixels.

Further, also when a contrast-enhanced Z spectrum and a non-contrast-enhanced Z spectrum are generated with respect to each of the plurality of pixels included in the contrast-enhanced ROI illustrated in FIG. 2, the identifying function 138 is configured to identify positions of a plurality of pixels included in the contrast-enhanced ROI. Subsequently, according to the pixel positions, the identifying function 138 is configured to identify each of a plurality of $B_1$ values corresponding to the identified plurality of pixels, in correspondence with the contrast-enhanced Z spectra and the non-contrast-enhanced Z spectra. By the identifying function 138, the contrast-enhanced Z spectra and the non-contrast-enhanced Z spectra are brought into correspondence with the $B_1$ values. The processing circuitry 150 realizing the identifying function 138 corresponds to an identifying unit.

By employing the calculating function 140, the processing circuitry 150 is configured to calculate a pH dependent value, by using a plurality of MR signal values corresponding to the fall points (or the local minima) of the plurality of signal values. For example, by using the MR signal values in at least two of the fall points of the plurality of MR signal values, the calculating function 140 is configured to calculate the pH dependent value. In that situation, the pH dependent value includes a ratio between the two MR signal values. The pH dependent value is a value dependent on pH. More specifically, the calculating function 140 is configured to calculate the pH dependent value by using a ratiometric method. However, possible methods for calculating the pH dependent value are not limited to using the ratiometric method. It is possible to use any of known methods, as appropriate.

More specifically, on the basis of the contrast-enhanced Z spectrum and the non-contrast-enhanced Z spectrum, the calculating function 140 is configured to calculate the falls of the plurality of signal values corresponding to the plurality of types of substances, at the fall points of the plurality of signal values. For example, when the contrast agent is iopamidol, the frequencies (4.2 ppm and 5.6 ppm) related to the two types of amide groups serving as the plurality of types of substances correspond to the plurality of frequencies related to the falls of the plurality of signal values. In other words, the plurality of frequencies (4.2 ppm and 5.6 ppm) correspond to the fall points related to iopamidol, as illustrated in FIG. 2. In this situation, as illustrated in FIG. 2, the calculating function 140 is configured to calculate the falls of the signal values at the positions of 4.2 ppm and 5.6 ppm, on the basis of the differences (hereinafter, "fall signal values") in the MR signal value with respect to the contrast-enhanced Z spectrum and to the non-contrast-enhanced Z spectrum. Subsequently, the calculating function 140 is configured to calculate the pH dependent value by implementing the ratiometric method, for example, while using the ratio between the fall signal value corresponding to 4.2 ppm and the fall signal value corresponding to 5.6 ppm. The calculating function 140 is configured to bring the $B_1$ value identified with respect to the Z spectra used in the calculation of the pH dependent value, into association with the calculated pH dependent value. The processing circuitry 150 realizing the calculating function 140 corresponds to a calculating unit.

By employing the selecting function 142, the processing circuitry 150 is configured to select a standard curve indicating a pH value corresponding to the pH dependent value, in accordance with the information related to the patient P, from among the plurality of standard curves prepared in advance in accordance with the information related to the patient P. In the present embodiment, the information related to the patient P is the $B_1$ map. In this situation, the selecting function 142 is configured to select the standard curve in accordance with the $B_1$ value (e.g., the $B_1$ value identified by the identifying function 138) based on the $B_1$ map, from among the plurality of standard curves prepared in advance in accordance with $B_1$ values. More specifically, the selecting function 142 is configured to select the standard curve related to the $B_1$ value equal to the $B_1$ value associated with the pH dependent value, from among the plurality of standard curves stored in the storage circuitry 132. In the process performed by the selecting function 142, the selecting process is repeatedly performed in accordance with $B_1$ values corresponding to the quantity of calculated pH dependent values. The processing circuitry 150 realizing the selecting function 142 corresponds to a selecting unit.

By employing the pH value determining function 144, the processing circuitry 150 is configured to determine a pH value, on the basis of the selected standard curve and the pH dependent value. More specifically, the pH value determining function 144 is configured to compare a pH dependent value on the selected standard curve with the calculated pH dependent value, so as to determine the pH value corresponding to a matching pH dependent value. In the process performed by the pH value determining function 144, the determining process is repeatedly performed in accordance with the quantity of pH dependent values. For example, when the total quantity of pH dependent values corresponds to the total quantity of the plurality of pixels included in the contrast-enhanced ROI or the entire imaged region, the pH value determining function 144 is configured to determine a plurality of pH values respectively corresponding to the plurality of pH dependent values, by comparing a plurality of standard curves selected in accordance with the $B_1$ values, with the plurality of pH dependent values. Into the storage circuitry 132, the pH value determining function 144 is configured to store the determined pH values so as to be kept in association with the positions of the pixels corresponding to the pH dependent values. The processing circuitry 150 realizing the pH value determining function 144 corresponds to a pH value determining unit.

Figure 4:
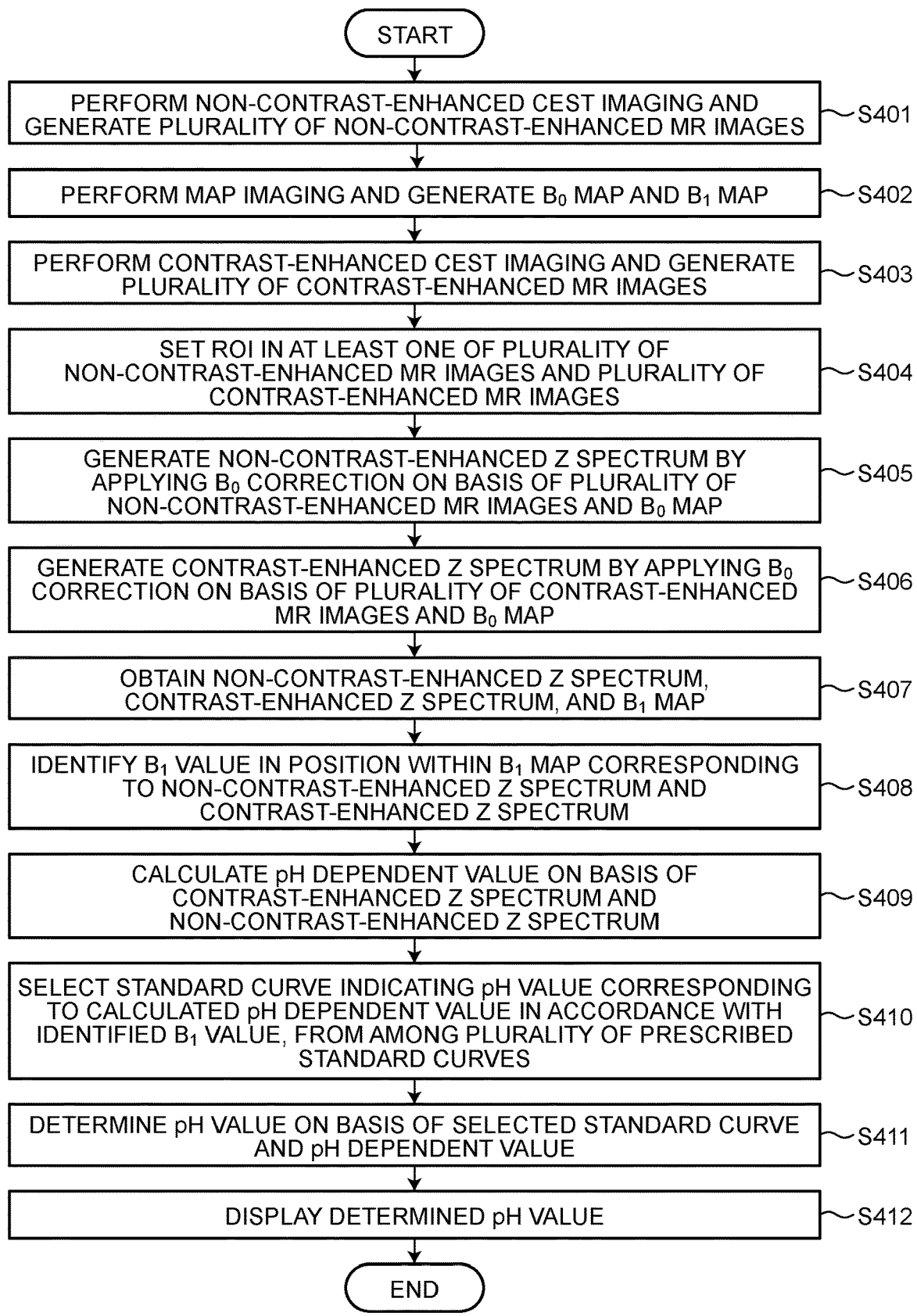
FIG. 4 is a flowchart according to the first embodiment illustrating an example of a procedure in a pH value determining process.

An overall configuration of the MRI apparatus 100 according to the first embodiment has thus been explained. The MRI apparatus 100 structured as described above is configured to perform the non-contrast-enhanced CEST imaging, the map imaging, and the contrast-enhanced CEST imaging and to perform the process (hereinafter, "pH value determining process") of determining the pH value by using the MR data acquired from each of the imaging processes and the standard curve determined by using the $B_1$ value. Next, a procedure related to the pH value determining process will be explained, with reference to FIG. 4. FIG. 4 is a flowchart illustrating an example of the procedure in the pH value determining process.

In the following sections, to explain a specific example, it is assumed that the static magnetic field intensity is 3 T, while the frequency range in which a plurality of saturation pulses are applied during the contrast-enhanced and the non-contrast-enhanced CEST imaging is the range from −8 ppm to 8 ppm. In that situation, the frequency of the saturation pulse corresponding to 0 ppm, i.e., the center frequency, is 128 MHz. Further, it is assumed that the sequence information related to the non-contrast-enhanced CEST imaging, the map imaging, and the contrast-enhanced CEST imaging is set in advance. Because it is possible to apply a known method to the process of setting of the sequence information, explanations thereof will be omitted. Further, in the pH value determining process, the non-contrast-enhanced CEST imaging, the map imaging, and the contrast-enhanced CEST imaging use mutually the same subject as an imaged subject. In other words, the imaged site of the non-contrast-enhanced CEST imaging, the map imaging, and the contrast-enhanced CEST imaging are mutually the same.

The pH Value Determining Process

Step S401

By employing the interface function 131, the processing circuitry 150 transmits, to the sequence controlling circuitry 120, the sequence information related to the non-contrast-enhanced CEST imaging, the map imaging, and the contrast-enhanced CEST imaging. The sequence controlling circuitry 120 performs the non-contrast-enhanced CEST imaging on the patient P, according to the sequence information related to the non-contrast-enhanced CEST imaging. By employing the interface function 131, the processing circuitry 150 receives non-contrast-enhanced data from the sequence controlling circuitry 120. By employing the image generating function 134, the processing circuitry 150 generates a plurality of non-contrast-enhanced MR images on the basis of the non-contrast-enhanced data. The image generating function 134 stores the generated plurality of non-contrast-enhanced MR images into the storage circuitry 132.

Step S402

The sequence controlling circuitry 120 performs the map imaging on the patient P, according to the sequence information related to the map imaging. By employing the interface function 131, the processing circuitry 150 receives map MR data from the sequence controlling circuitry 120. By employing the image generating function 134, the processing circuitry 150 generates a $B_0$ map and a $B_1$ map on the basis of the map MR data. The image generating function 134 stores the generated $B_0$ and $B_1$ maps into the storage circuitry 132. Alternatively, the process at present step may be performed after step S403 described below.

Step S403

Prior to the present step, a contrast agent is injected into the patient P. In this situation, the injected contrast agent is a contrast agent containing a plurality of types of substances having mutually-different responsiveness to pH during chemical shift imaging. In the following sections, to explain a specific example, it is assumed that the contrast agent is iopamidol. Alternatively, the contrast agent may be iopromide. The sequence controlling circuitry 120 performs the contrast-enhanced CEST imaging on the patient P, according to the sequence information related to the contrast-enhanced CEST imaging. By employing the interface function 131, the processing circuitry 150 receives contrast-enhanced data from the sequence controlling circuitry 120. By employing the image generating function 134, the processing circuitry 150 generates a plurality of contrast-enhanced MR images on the basis of the contrast-enhanced data. The image generating function 134 stores the generated plurality of contrast-enhanced MR images into the storage circuitry 132.

Step S404

Under control of the controlling function 133, the display 143 displays at least one of the plurality of non-contrast-enhanced images and the plurality of contrast-enhanced MR images. According to a user instruction, the input apparatus 141 receives, regarding the image displayed by the display 143, an input of a ROI within at least one of non-contrast-enhanced MR images among the plurality of non-contrast-enhanced images. As a result, the ROI is set within at least one of the plurality of non-contrast-enhanced MR images and the plurality of contrast-enhanced MR images. In another example, when the pixels subject to the pH value determining process are present throughout the entire imaged region, the process at present step is unnecessary.

Step S405

By employing the image generating function 134, the processing circuitry 150 generates a non-contrast-enhanced Z spectrum by applying a $B_0$ correction on the basis of the plurality of non-contrast-enhanced MR images and the $B_0$ map. More specifically, the image generating function 134 generates the non-contrast-enhanced Z spectrum with regard to the set ROI. In that situation, when a user instruction input via the input apparatus 141 indicates that a pH value is to be determined with respect to each of the plurality of pixels included in the ROI (e.g., that a pH map is to be generated), the image generating function 134 generates a plurality of non-contrast-enhanced Z spectra respectively corresponding to the plurality of pixels included in the set ROI. In the following sections, to explain a specific example, it is assumed that one non-contrast-enhanced Z spectrum is generated for the set ROI. The image generating function 134 stores the generated non-contrast-enhanced Z spectrum into the storage circuitry 132.

Step S406

By employing the image generating function 134, the processing circuitry 150 generates a contrast-enhanced Z spectrum including each of the plurality of signal value falls corresponding to the plurality of types of substances, by applying a $B_0$ correction, on the basis of the plurality of contrast-enhanced MR images and the $B_0$ map. More specifically, the image generating function 134 generates the contrast-enhanced Z spectrum with regard to the set ROI. In this situation, when a user instruction input via the input apparatus 141 indicates that a pH value is to be determined with respect to each of the plurality of pixels included in the ROI (e.g., that a pH map is to be generated), the image generating function 134 generates a plurality of contrast-enhanced Z spectra respectively corresponding to the plurality of pixels included in the set ROI. When one non-contrast-enhanced Z spectrum was generated for the set ROI, the image generating function 134 generates one contrast-enhanced Z spectrum for the set ROI. The image generating function 134 stores the generated contrast-enhanced Z spectrum into the storage circuitry 132. Alternatively, the process at step S405 and the process at step S406 may be performed in the reverse order.

Step S407

By employing the obtaining function 136, the processing circuitry 150 obtains, from the storage circuitry 132, the non-contrast-enhanced Z spectrum, the contrast-enhanced Z spectrum, and the $B_1$ map corresponding to the information related to the patient P. In another example, when the processing circuitry 150 is installed in a pH calculating apparatus or the like separate from the MRI apparatus 100, the obtaining function 136 is configured to obtain the non-contrast-enhanced Z spectrum, the contrast-enhanced Z spectrum, and the $B_1$ map from another MRI apparatus, for example.

Step S408

By employing the identifying function 138, the processing circuitry 150 identifies a $B_1$ value in a position within the $B_1$ map, with respect to the non-contrast-enhanced Z spectrum and the contrast-enhanced Z spectrum. When one non-contrast-enhanced Z spectrum and one contrast-enhanced Z spectrum were generated for the ROI, the identifying function 138 identifies the $B_1$ value corresponding to the non-contrast-enhanced Z spectrum and the contrast-enhanced Z spectrum, by dividing a sum of the plurality of $B_1$ values included in the region corresponding to the ROI within the $B_1$ map by the quantity of the pixels included in the ROI. In other words, when the plurality of pixels are associated with the generation of the one non-contrast-enhanced Z spectrum and the generation of the one contrast-enhanced Z spectrum, the identifying function 138 identifies the $B_1$ value corresponding to the one non-contrast-enhanced Z spectrum and the one contrast-enhanced Z spectrum, by calculating an average of the plurality of $B_1$ values corresponding to the positions of the plurality of pixels. Alternatively, the process at the present step may be performed after step S409 described below.

When a plurality of non-contrast-enhanced Z spectra and a plurality of contrast-enhanced Z spectra are generated in correspondence with a plurality of pixels, the identifying function 138 is configured to identify $B_1$ values in positions within the $B_1$ map respectively corresponding to the plurality of pixels. For example, when a non-contrast-enhanced Z spectrum and a contrast-enhanced Z spectrum are generated with respect to each of the plurality of pixels that are present throughout the entire imaged region, the identifying function 138 is configured to identify, in the $B_1$ map, the $B_1$ values corresponding to the non-contrast-enhanced Z spectra and to the contrast-enhanced Z spectra, by using the positions of the pixels related to the generation of the non-contrast-enhanced Z spectra and the generation of the contrast-enhanced Z spectra.

Step S409

By employing the calculating function 140, the processing circuitry 150 calculates a pH dependent value on the basis of the contrast-enhanced Z spectrum and the non-contrast-enhanced Z spectrum. More specifically, the calculating function 140 calculates two fall signal values at 4.2 ppm and 5.6 ppm, by using the plurality of MR signal values corresponding to the fall points of the plurality of signal value in the contrast-enhanced spectrum and the plurality of MR signal values corresponding to the plurality of frequencies in the non-contrast-enhanced Z spectrum. Subsequently, the calculating function 140 calculates the pH dependent value, by performing a predetermined calculating process including the calculation of the ratio between the two fall signal values. For example, the predetermined calculating process may be a calculating process using the ratiometric method, for example.

Step S410

By employing the selecting function 142, the processing circuitry 150 selects a standard curve indicating a pH value corresponding to the calculated pH dependent value in accordance with the identified $B_1$ value, from among the plurality of standard curves stored in the storage circuitry 132. For example, the process of selecting a standard curve is performed multiple times in accordance with the quantity of the identified $B_1$ values. In the situation where no standard curve corresponding to the identified $B_1$ value is stored in the storage circuitry 132, the selecting function 142 may select a standard curve corresponding to a $B_1$ value closest to the identified $B_1$ value, from among the plurality of standard curves.

Alternatively, in the situation where no standard curve corresponding to the identified $B_1$ value is stored in the storage circuitry 132, the selecting function 142 may select two standard curves corresponding to two $B_1$ values close to the identified $B_1$ value, from among the plurality of standard curves. In that situation, the calculating function 140 calculates a standard curve corresponding to the identified $B_1$ value from the two selected standard curves by performing an interpolating process such as weighted addition or averaging, for example, on the basis of the differences between the two $B_1$ values related to the two selected standard curves and the identified $B_1$ value. In this manner, the selecting function 142 selects the calculated standard curve as the standard curve corresponding to the identified $B_1$ value, from among the plurality of standard curves.

Step S411

By employing the pH value determining function 144, the processing circuitry 150 determines a pH value on the basis of the selected standard curve and the pH dependent value. More specifically, the pH value determining function 144 determines the pH value corresponding to the calculated pH dependent value in the selected standard curve, as a pH value in the position of the pixel related to the contrast-enhanced Z spectrum used for the calculation of the pH dependent value. When two or more pH dependent values have been calculated, the pH value determining function 144 repeatedly performs the process of determining a pH dependent value as many times as the quantity of the contrast-enhanced Z spectra.

Step S412

Under the control of the controlling function 133, the processing circuitry 150 causes the display 143 to display the determined pH value. For example, by employing the image generating function 134, the processing circuitry 150 generates a superimposition image obtained by superimposing the determined pH value in the position of the pixel for which the pH dependent value was calculated, within an MR image such as the one contrast-enhanced MR image or the one non-contrast-enhanced image. The pH value in the superimposition image is expressed by using a color scale or a gray scale corresponding to the pH value, for example. By employing the controlling function 133, the processing circuitry 150 causes the display 143 to display the superimposition image.

Further, when a plurality of pH values respectively corresponding to a plurality of pixels have been determined the processing circuitry 150 may generate a pH map by arranging the plurality of pH values in positions of a plurality of pixels corresponding to the plurality of pH values, by employing the image generating function 134. The pH values in the pH map are expressed, for example, by using a color scale or a gray scale corresponding to the pH values. Further, the image generating function 134 may superimpose the pH map on the MR image. By employing the controlling function 133, the processing circuitry 150 causes the display 143 to display the superimposition image in which the pH map is superimposed and/or the pH map.

The MRI apparatus 100 according to the first embodiment described above is configured: to perform the CEST imaging process by using, for the patient P, the contrast agent containing the plurality of types of substances having the mutually-different responsiveness to pH during chemical shift imaging and another imaging process different from the CEST imaging process; to generate the $B_1$ map on the basis of the MR data acquired from the different imaging process; to generate the Z spectrum on the basis of the MR data acquired from the CEST imaging process; to calculate the pH dependent value by using the plurality of MR signal values corresponding to the fall points of the plurality of signal values; to select the standard curve indicating the pH value corresponding to the pH dependent value in accordance with the $B_1$ value based on the $B_1$ map, from among the plurality of standard curves prepared in advance in accordance with $B_1$ values; and to determine the pH value on the basis of the selected standard curve and the pH dependent value.

Further, the MRI apparatus 100 according to the first embodiment is configured to calculate the pH dependent value by using at least two of the plurality of MR signal values, the pH dependent value including the ratio between the two MR signal values. Further, the MRI apparatus 100 according to the first embodiment is configured to calculate the pH dependent value by implementing the ratiometric method. Also, the Z spectrum of the MRI apparatus 100 according to the first embodiment is represented by the spectrum data obtained by correcting the positions of the saturation pulses used in the CEST imaging processes, on the basis of the $B_0$ map generated from the different imaging process.

With these arrangements, by using the MRI apparatus 100 according to the first embodiment, because the plurality of standard curves corresponding to the plurality of $B_1$ values are stored in the storage circuitry 132 in advance, it is possible to determine the pH value on the basis of the pH dependent value, by using the standard curve corresponding to the $B_1$ value identified from the $B_1$ map. Consequently, the MRI apparatus 100 according to the first embodiment is able to correct pH value errors which may be caused by the $B_1$ non-uniformity so as to be smaller.

As explained herein, the MRI apparatus 100 according to the first embodiment is able to determine more accurate pH values without being influenced by the $B_1$ non-uniformity. It is therefore possible to enhance accuracy of diagnosis processes for the patient P.

Second Embodiment

Figure 5:
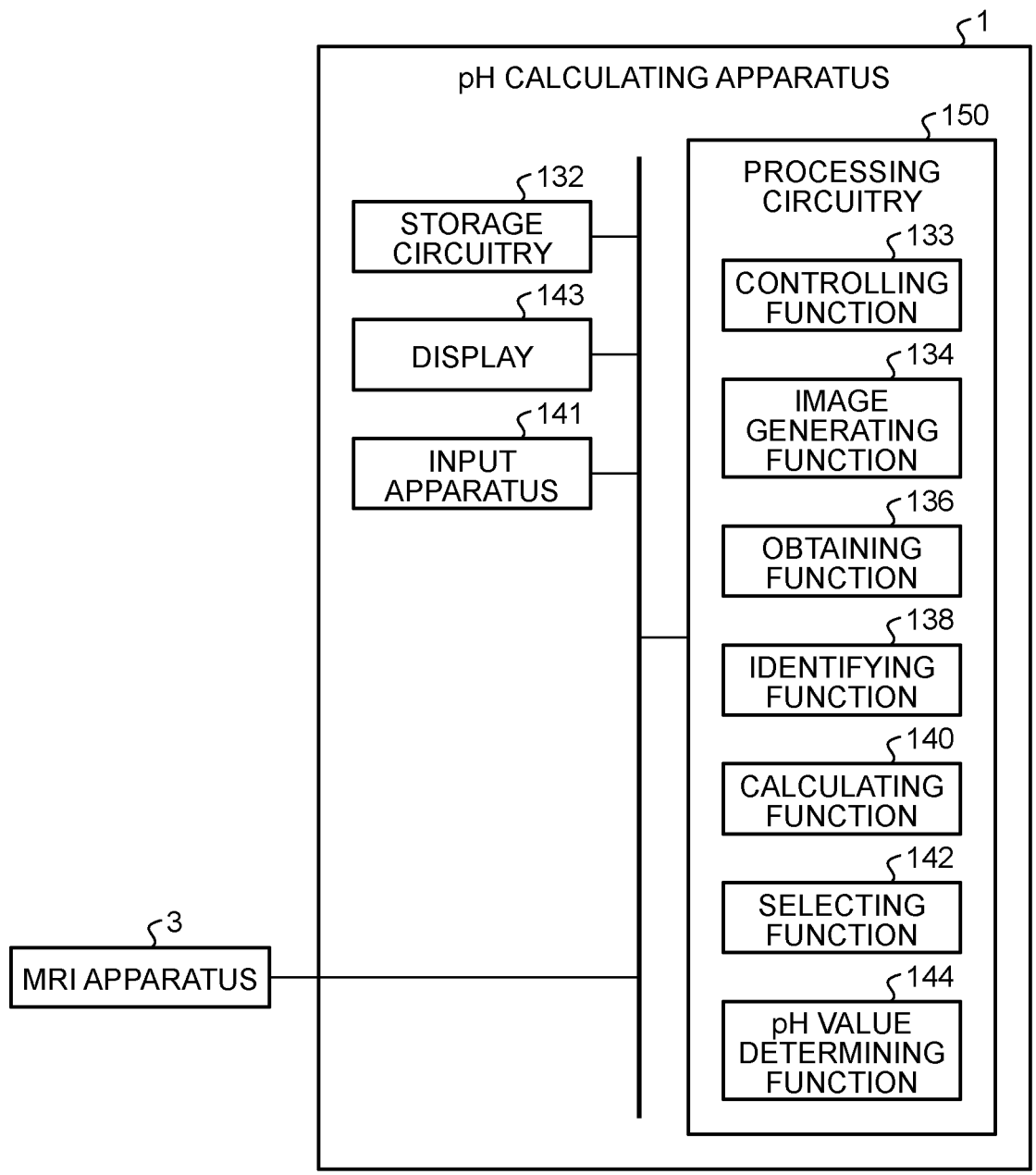
FIG. 5 is a diagram according to a second embodiment illustrating an exemplary configuration of a pH calculating apparatus.

In the present embodiment, the processes at step S407 and thereafter in the pH value determining process is realized by a pH calculating apparatus. FIG. 5 is diagram illustrating an exemplary configuration of a pH calculating apparatus 1. Differences from the first embodiment lie in a process performed by the controlling function 133 and a process performed by the obtaining function 136. Because the other configurations besides the controlling function 133 and the obtaining function 136 are the same as those in the first embodiment except for processes specific to an MRI apparatus 3, explanations thereof will be omitted. The controlling function 133 is configured to control the entirety of the pH calculating apparatus 1. Further, the obtaining function 136 is configured to obtain, from the other MRI apparatus 3, for example, a non-contrast-enhanced Z spectrum, a contrast-enhanced Z spectrum, and information related to the patient P. The information related to the patient P is a $B_1$ map, for example. Further, in the pH value determining process realized in the present embodiment, the processes at step S407 and thereafter are performed. Because the processes at step S407 and thereafter performed by the pH calculating apparatus 1 are the same as those in the first embodiment, explanations thereof will be omitted.

The pH calculating apparatus 1 according to the second embodiment is configured: to obtain at least one Z spectrum that is generated from the CEST imaging process by using, for the patient P, the contrast agent containing the plurality of types of substances having the mutually-different responsiveness to pH during chemical shift imaging and that includes the fall points of the plurality of signal values corresponding to the plurality of types of substances and to also obtain the $B_1$ map generated from another imaging process different from the CEST imaging process; to calculate the pH dependent value by using the plurality of MR signal values corresponding to the fall points of the plurality of signal values; to select the standard curve indicating the pH value corresponding to the pH dependent value in accordance with the $B_1$ value based on the $B_1$ map from among the plurality of standard curves prepared in advance in accordance with $B_1$ values; and to determine the pH value on the basis of the selected standard curve and the pH dependent value. Because the processes performed by various constituent elements of the pH calculating apparatus 1 and advantageous effects and the like of the pH value determining process realized by the pH calculating apparatus 1 are the same as those of the first embodiment, explanations thereof will be omitted.

Third Embodiment

In the present embodiment, as the information related to the patient P, the $B_1$ map and a temperature of the patient P are used. In the first and the second embodiments described above, the $B_1$ map is used as the information related to the patient P. In the first and the second embodiments, the temperature of the patient P is assumed to be approximately 37° C., for example. However, the temperature (the body temperature) of the patient P has an individual difference. In addition, even when the patient P is the same, the body temperature may vary depending on health conditions of the patient P. Further, when cancer is present in a ROI, the temperature of the cancer may be different from the body temperature of the patient P (e.g., may be lower than the body temperature or may be higher than the body temperature). The exchange speed of the protons in the CEST effect are dependent on temperature and pH.

Figure 6:
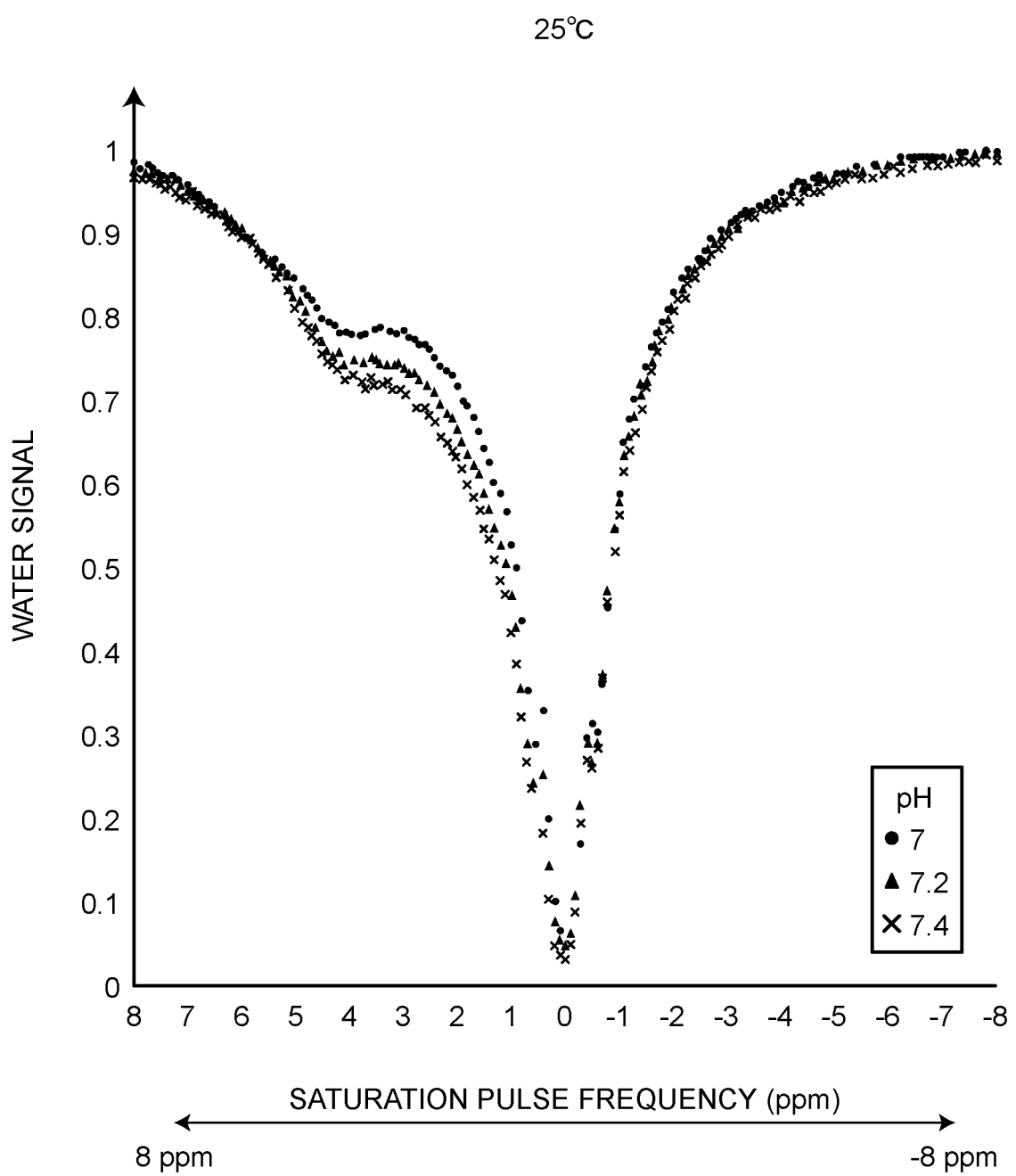
FIG. 6 is a chart according to a third embodiment illustrating an example of three Z spectra corresponding to three pH values, when the temperature of a phantom is 25° C.
Figure 7:
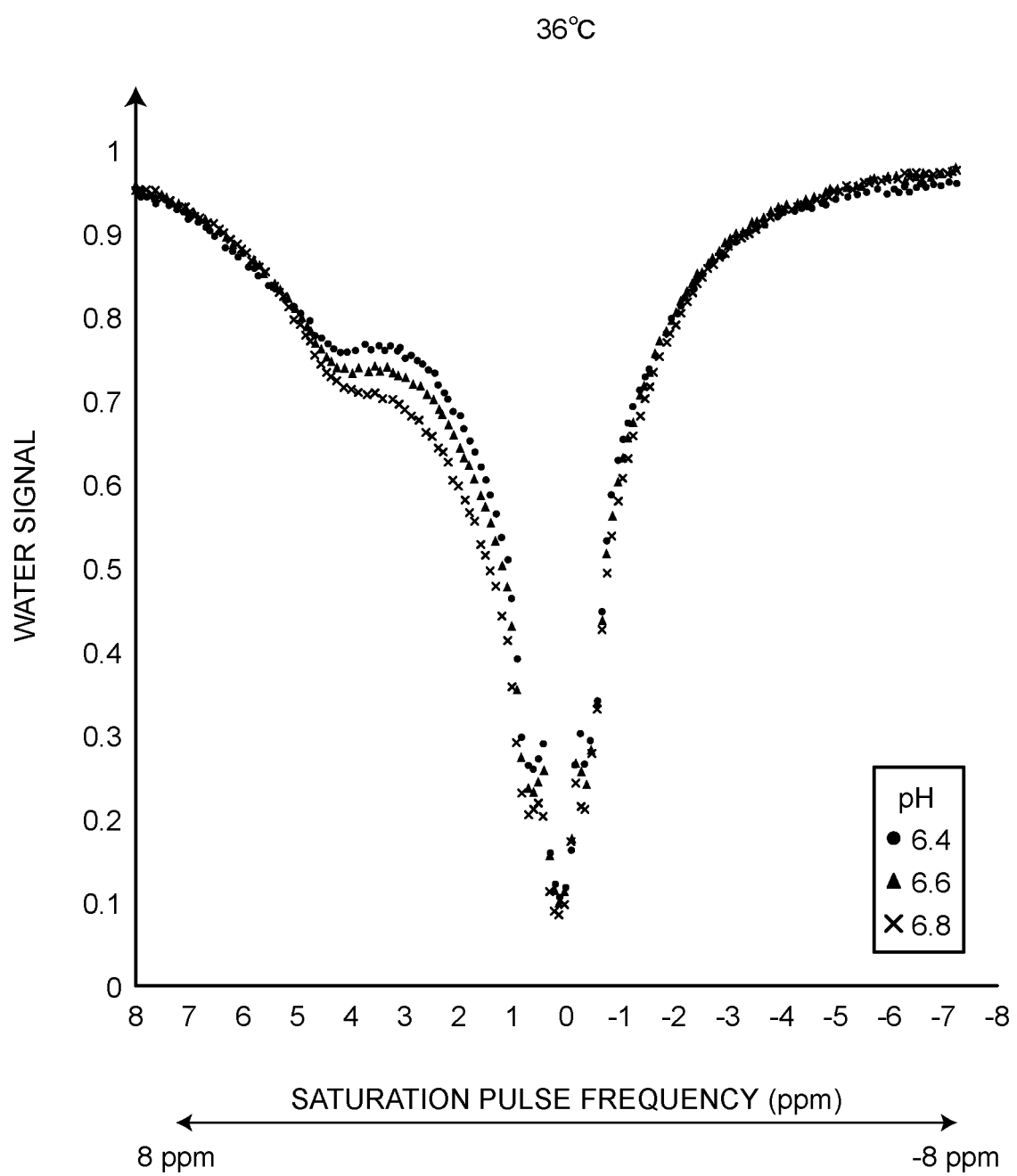
FIG. 7 is a chart according to the third embodiment illustrating an example of three Z spectra corresponding to three pH values, when the temperature of a phantom is 36° C.

FIG. 6 is a chart illustrating three Z spectra corresponding to three pH values (pH 7, pH 7.2, and pH 7.4) when the temperature of a phantom is 25° C. FIG. 7 is a chart illustrating an example of three Z spectra corresponding to three pH values (pH 6.4, pH 6.6, and pH 6.8) when the temperature of a phantom is 36° C. The plurality of Z spectra in FIGS. 6 and 7 are plotted on the basis of MR signals under substantially the same image taking conditions, except for the temperatures and the pH values.

As illustrated in FIGS. 6 and 7, the shapes of the Z spectra corresponding to pH 7, pH 7.2, and pH 7.4 in FIG. 6 are extremely similar to the shapes of the Z spectra corresponding to pH 6.4, pH 6.6, and pH 6.8 in FIG. 7. The shapes of the Z spectra being extremely similar correspond to the chemical exchange speeds of hydrogen atoms being extremely similar. For example, as illustrated in FIGS. 6 and 7, the chemical exchange speed of the hydrogen atoms exhibited for pH 7 at 25° C. is extremely similar to the chemical exchange speed of the hydrogen atoms exhibited for pH 6.4 at 36° C. For this reason, for example, when a Z spectrum corresponding to pH 7 at 25° C. in FIG. 6 is obtained from a CEST imaging process, if the standard curve for 25° C. is used for determining a pH value, the pH value would be determined as 7, although the pH value corresponding to the temperature of the patient P being 36° C. of is 6.4.

For this reason, in the first and the second embodiments in which the temperature (the body temperature) of the patient P is assumed to be constant, there is a possibility that the precision level of the pH value may be degraded. Accordingly, in the present embodiment, as the information related to the patient P, the temperature of the patient P is used in addition to the $B_1$ map. In other words, in the present embodiment, the $B_1$ map and the temperature of the patient P are obtained, so as to determine a pH Value by using a standard curve corresponding to the temperature of the patient P and to the $B_1$ value.

The storage circuitry 132 has stored therein a plurality of standard curves corresponding to a plurality of $B_1$ values and to a plurality of temperatures. For example, the storage circuitry 132 has stored therein the plurality of standard curves kept in correspondence with the plurality of $B_1$ values and the plurality of temperatures, by using the format of a plurality of correspondence tables (Lookup Tables (LUTs)). The plurality of standard curves are prepared in advance, for example, on the basis of actual measurement values measured in advance by using a phantom or the like, similarly to the embodiment, and are stored in the storage circuitry 132. The actual measurement values in the present embodiment are, for example, $B_1$ values, temperatures, pH dependent values, pH values, and/or the like. The plurality of standard curves may be represented by data based on actual measuring processes, data calculated from a simulation, or data obtained by interpolating the actual measurement values and may be data prepared in advance. In the present embodiment, the interpolation denotes calculating a standard curve by interpolating two adjacent $B_1$ values and two adjacent temperatures. The plurality of standard curves correspond to a database of standard curves classified according to the plurality of $B_1$ values and the plurality of temperatures.

By employing the obtaining function 136, the processing circuitry 150 is configured to obtain at least one Z spectrum, as well as the temperature of the patient P and the $B_1$ map as the information related to the patient P. The temperature of the patient P may be monitored during the process of determining a pH value or may be obtained before the process is performed.

By employing the selecting function 142, the processing circuitry 150 is configured to select a standard curve indicating a pH value corresponding to the pH dependent value in accordance with the information related to the patient P, from among the plurality of standard curves prepared in advance in accordance with the information related to the patient P. In the present embodiment, the information related to the patient P is the $B_1$ map and the temperature of the patient P. In this situation, the selecting function 142 is configured to select the standard curve in accordance with the $B_1$ value (e.g., the $B_1$ value identified by the identifying function 138) based on the $B_1$ map and the temperature of the patient P, from among the plurality of standard curves prepared in advance in accordance with $B_1$ values and temperatures of the patient P. More specifically, the selecting function 142 is configured to select the standard curve that is related to the $B_1$ value equal to the $B_1$ value associated with the pH dependent value and that corresponds to the temperature equal to the temperature of the patient P, from among the plurality of standard curves stored in the storage circuitry 132.

The MRI apparatus 100 according to the present embodiment is configured to perform the non-contrast-enhanced CEST imaging, the map imaging, and the contrast-enhanced CEST imaging and to perform the pH value determining process to determine a pH value by using the MR data acquired from each of the imaging processes and the standard curve determined by using the $B_1$ value and the temperature of the patient P. Next, a procedure related to the pH value determining process according to the present embodiment will be explained, with reference to FIG. 8.

FIG. 8 is a flowchart illustrating an example of the procedure in the pH value determining process according to the present embodiment. The flowchart in FIG. 8 corresponds to the procedure in the processes subsequent to step S406 in the pH value determining process according to the first and the second embodiments. In other words, the process at step S801 in FIG. 8 is performed after step S406.

The pH Value Determining Process

Step S801

The temperature of the patient P is measured. The temperature of the patient P is a body temperature, for example. The temperature of the patient P is measured, for example, by using a known thermometer or a known temperature measuring method based on a phase difference in a phase image acquired by CEST imaging or map imaging. The temperature of the patient P may be measured before the CEST imaging in the pH value determining process is performed or may be measured during the CEST imaging.

Step S802:

By employing the obtaining function 136, the processing circuitry 150 obtains, from the storage circuitry 132, the non-contrast-enhanced Z spectrum, the contrast-enhanced Z spectrum, and the $B_1$ map and the temperature of the patient P included in the information related to the patient P. In another example, when the processing circuitry 150 is installed in the pH calculating apparatus 1 or the like separate from the MRI apparatus 100, the obtaining function 136 is configured to obtain the non-contrast-enhanced Z spectrum, the contrast-enhanced Z spectrum, the $B_1$ map, and the temperature of the patient P from another MRI apparatus, for example. Alternatively, the temperature of the patient P may be obtained from a known thermometer, instead of from said another MRI apparatus.

Step S803

By employing the identifying function 138, the processing circuitry 150 identifies a $B_1$ value in a position within the $B_1$ map, with respect to the non-contrast-enhanced Z spectrum and the contrast-enhanced Z spectrum. Because the process at the present step is the same as that at step S408, explanations thereof will be omitted.

Step S804

By employing the calculating function 140, the processing circuitry 150 calculates a pH dependent value, on the basis of the contrast-enhanced spectrum and the non-contrast-enhanced Z spectrum. Because the process at the present step is the same as that at step S409, explanations thereof will be omitted.

Step S805

By employing the selecting function 142, the processing circuitry 150 selects a standard curve indicating a pH value corresponding to the calculated pH dependent value in accordance with the identified $B_1$ value and the obtained body temperature of the patient P, from among the plurality of standard curves stored in the storage circuitry 132. For example, the process of selecting a standard curve is performed multiple times in accordance with the quantity of the identified $B_1$ values and the quantity of the obtained body temperatures of the patient P. In the situation where no standard curve corresponding to the identified $B_1$ value and to the body temperature of the patient P is stored in the storage circuitry 132, the selecting function 142 may select a standard curve corresponding to a $B_1$ value closest to the identified $B_1$ value and to a temperature closest to the obtained body temperature of the patient P, from among the plurality of standard curves.

Alternatively, when no standard curve corresponding to the identified $B_1$ value and to the obtained temperature of the patient P is stored the storage circuitry 132, the selecting function 142 may select two standard curves corresponding to two $B_1$ values close to the identified $B_1$ value and two standard curves corresponding to two temperatures close to the obtained temperature of the patient P, from among the plurality of standard curves. In that situation, for example, the calculating function 140 calculates a standard curve corresponding to the identified $B_1$ value and to the obtained temperature from the four selected standard curves, by performing an interpolating process such as weighted addition or averaging, for example, on the basis of the differences between the four $B_1$ values related to the four selected standard curves and the identified $B_1$ value and the differences between the four temperatures related to the four standard curves and the obtained temperature. In this manner, the selecting function 142 may select the calculated standard curve as a standard curve corresponding to the standard curve that corresponds to the identified $B_1$ value and to the obtained temperature, from among the plurality of standard curves.

Step S806

By employing the pH value determining function 144, the processing circuitry 150 determines a pH value on the basis of the selected standard curve and the pH dependent value. Because the process at the present step is the same as that at step S411, explanations thereof will be omitted.

Step S807:

Under the control of the controlling function 133, the processing circuitry 150 causes the display 143 to display the determined pH value. Because the process at the present step is the same as that at step S412, explanations thereof will be omitted.

The MRI apparatus 100 according to the third embodiment described above is configured: to perform he CEST imaging process by using, for the patient P, the contrast agent containing the plurality of types of substances having the mutually-different responsiveness to pH during chemical shift imaging and another imaging process different from the CEST imaging process; to generate the $B_1$ map on the basis of the MR data acquired from the different imaging process; to obtain the temperature of the patient P; to generate the Z spectrum on the basis of the MR data acquired from the CEST imaging process; to calculate the pH dependent value by using the plurality of MR signal values corresponding to the fall points of the plurality of signal values; to select the standard curve indicating the pH value corresponding to the pH dependent value in accordance with the $B_1$ value based on the $B_1$ map and the temperature of the patient P, from among the plurality of standard curves prepared in advance in accordance with $B_1$ values and temperatures; and to determine the pH value on the basis of the selected standard curve and the pH dependent value.

By using the MRI apparatus 100 according to the third embodiment, because the plurality of standard curves corresponding to the plurality of $B_1$ values and to the plurality of temperatures are stored in the storage circuitry 132 in advance, it is possible to determine the pH value on the basis of the pH dependent value, by using the standard curve corresponding to the $B_1$ value identified from the $B_1$ map and to the body temperature of the patient P obtained from the patient P. Consequently, the MRI apparatus 100 according to the third embodiment is able to correct pH value errors which may be caused by the $B_1$ non-uniformity so as to be smaller and to also correct pH value errors which may be caused by temperatures.

As explained herein, the MRI apparatus 100 according to the third embodiment is able to determine more accurate pH values without being influenced by the $B_1$ non-uniformity and the temperature of the patient P. Consequently, the MRI apparatus 100 according to the third embodiment is able to enhance the precision level of the pH measuring process and to enhance accuracy of diagnosis processes for the patient P, regardless of health conditions of the patient P and the presence/absence of cancer.

In a modification example of the present embodiment, the technical features of the present embodiment may be realized by the pH calculating apparatus 1. Because the processes performed by various constituent elements of the pH calculating apparatus 1 and advantageous effects and the like of the pH value determining process realized by the pH calculating apparatus 1 are the same as those of the third embodiment, explanations thereof will be omitted.

Fourth Embodiment

In the present embodiment, a temperature of the patient P is used as the information related to the patient P. The storage circuitry 132 has stored therein a plurality of standard curves corresponding to a plurality of temperatures. For example, the storage circuitry 132 has stored therein the plurality of standard curves kept in correspondence with the plurality of temperatures, by using the format of a plurality of correspondence tables (Lookup Tables (LUTs)). The plurality of standard curves are prepared in advance, for example, on the basis of actual measurement values measured in advance by using a phantom or the like, similarly to the embodiment, and are stored in the storage circuitry 132. The actual measurement values in the present embodiment are, for example, temperatures, pH dependent values, pH values, and/or the like. The plurality of standard curves may be represented by data based on actual measuring processes, data calculated from a simulation, or data obtained by interpolating the actual measurement values and may be data prepared in advance. In the present embodiment, the interpolation denotes calculating a standard curve by interpolating two adjacent temperatures. The plurality of standard curves correspond to a database of standard curves classified according to the plurality of temperatures.

By employing the obtaining function 136, the processing circuitry 150 is configured to obtain at least one Z spectrum and a temperature of the patient P as the information related to the patient P. The temperature of the patient P may be monitored during the process of determining a pH value or may be obtained before the process is performed.

By employing the selecting function 142, the processing circuitry 150 is configured to select a standard curve indicating a pH value corresponding to the pH dependent value, in accordance with the temperature of the patient P, from among the plurality of standard curves prepared in advance in accordance with the information related to the patient P. In this situation, the selecting function 142 is configured to select the standard curve in accordance with the temperature of the patient P, from among the plurality of standard curves prepared in advance in accordance with temperatures of the patient P. More specifically, the selecting function 142 is configured to select the standard curve corresponding to the temperature equal to the temperature of the patient P, from among the plurality of standard curves stored in the storage circuitry 132.

The MRI apparatus 100 according to the present embodiment is configured to perform the non-contrast-enhanced CEST imaging, the map imaging, and the contrast-enhanced CEST imaging and to perform the pH value determining process to determine the pH value by using the MR data acquired from each of the imaging processes and the standard curve determined by using the temperature of the patient P. Next, a procedure related to the pH value determining process according to the present embodiment will be explained with reference to FIG. 9.

FIG. 9 is a flowchart illustrating an example of the procedure in the pH value determining process according to the present embodiment. The flowchart in FIG. 9 corresponds to the procedure in the process subsequent to step S406 in the pH value determining process according to the first and the second embodiments. In other words, the process at step S901 in FIG. 9 is performed after step S406. In the present embodiment, the $B_1$ map generating process at step S402 is unnecessary.

The pH Value Determining Process

Step S901

A temperature of the patient P is measured. Because the process at the present step is the same as that at step S801, explanations thereof will be omitted.

Step S902

By employing the obtaining function 136, the processing circuitry 150 obtains, from the storage circuitry 132, the non-contrast-enhanced Z spectrum, the contrast-enhanced Z spectrum, and the temperature of the patient P serving as the information related to the patient P. In another example, when the processing circuitry 150 is installed in the pH calculating apparatus 1 or the like separate from the MRI apparatus 100, the obtaining function 136 is configured to obtain the non-contrast-enhanced Z spectrum, the contrast-enhanced Z spectrum, and the temperature of the patient P from another MRI apparatus, for example. Alternatively, the temperature of the patient P may be obtained from a known thermometer, instead of from said another MRI apparatus.

Step S903

By employing the calculating function 140, the processing circuitry 150 calculates a pH dependent value, on the basis of the contrast-enhanced spectrum and the non-contrast-enhanced Z spectrum. Because the process at the present step is the same as that at step S409, explanations thereof will be omitted.

Step S904

By employing the selecting function 142, the processing circuitry 150 selects a standard curve indicating a pH value corresponding to the calculated pH dependent value in accordance with the obtained body temperature of the patient P, from among the plurality of standard curves stored in the storage circuitry 132. For example, the process of selecting a standard curve is performed multiple times in accordance with the quantity of the obtained body temperatures of the patient P. In the situation where no standard curve corresponding to the obtained body temperature of the patient P is stored in the storage circuitry 132, the selecting function 142 may select a standard curve corresponding to a temperature closest to the obtained body temperature of the patient P, from among the plurality of standard curves.

Alternatively, when no standard curve corresponding to the obtained temperature of the patient P is stored the storage circuitry 132, the selecting function 142 may select two standard curves corresponding to two temperatures close to the obtained temperature of the patient P, from among the plurality of standard curves. In that situation, for example, the calculating function 140 calculates a standard curve corresponding to the obtained temperature from the two selected standard curves, by performing an interpolating process such as weighted addition or averaging, for example, on the basis of the differences between the two temperatures related to the two selected standard curves and the obtained temperature. In this manner, the selecting function 142 may select the calculated standard curve as a standard curve corresponding to the standard curve that corresponds to the obtained temperature, from among the plurality of standard curves.

Step S905

By employing the pH value determining function 144, the processing circuitry 150 determines a pH value on the basis of the selected standard curve and the pH dependent value. Because the process at the present step is the same as that at step S411, explanations thereof will be omitted.

Step S906

Under the control of the controlling function 133, the processing circuitry 150 causes the display 143 to display the determined pH value. Because the process at the present step is the same as that at step S412, explanations thereof will be omitted.

The MRI apparatus 100 according to the fourth embodiment described above is configured: to perform the CEST imaging process by using, for the patient P, the contrast agent containing the plurality of types of substances having the mutually-different responsiveness to pH during chemical shift imaging; to obtain the temperature of the patient P; to generate the Z spectrum on the basis of the MR data acquired from the CEST imaging process; to calculate the pH dependent value by using the plurality of MR signal values corresponding to the fall points of the plurality of signal values; to select the standard curve indicating the pH value corresponding to the pH dependent value in accordance with the temperature of the patient P, from among the plurality of standard curves prepared in advance in accordance with temperatures; and to determine the pH value on the basis of the selected standard curve and the pH dependent value.

By using the MRI apparatus 100 according to the fourth embodiment, because the plurality of standard curves corresponding to the plurality of temperatures are stored in the storage circuitry 132 in advance, it is possible to determine the pH value on the basis of the pH dependent value, by using the standard curve corresponding to the body temperature of the patient P obtained from the patient P. Consequently, the MRI apparatus 100 according to the fourth embodiment is able to correct pH value errors caused by temperatures.

As explained herein, the MRI apparatus 100 according to the fourth embodiment is able to determine accurate pH values without being influenced by the temperature of the patient P, even when the $B_1$ non-uniformity is extremely small. Consequently, the MRI apparatus 100 according to the fourth embodiment is able to enhance the precision level of the pH measuring process and to enhance accuracy of diagnosis processes for the patient P, regardless of health conditions of the patient P and the presence/absence of cancer.

In a modification example of the present embodiment, the technical features of the present embodiment may be realized by the pH calculating apparatus 1. Because the processes performed by various constituent elements of the pH calculating apparatus 1 and advantageous effects and the like of the pH value determining process realized by the pH calculating apparatus 1 are the same as those of the fourth embodiment, explanations thereof will be omitted.

When technical concept of the embodiments is realized as a pH calculating method, the pH calculating method includes: obtaining at least one Z spectrum that is generated from a Chemical Exchange Saturation Transfer (CEST) imaging process by using, for the patient P, a contrast agent containing a plurality of types of substances having mutually-different responsiveness to pH during chemical shift imaging and that includes fall points of a plurality of signal values respectively corresponding to the plurality of types of substances and also obtaining information related to the patient P; calculating a pH dependent value by using a plurality of MR signal values corresponding to the fall points of the plurality of signal values; selecting a standard curve indicating a pH value corresponding to the pH dependent value in accordance with the information related to the patient P, from among a plurality of standard curves prepared in advance in accordance with the information related to the patient P; and determining a pH value on the basis of the selected standard curve and the pH dependent value. Because the procedure and advantageous effects of the pH value determining process performed by implementing the pH calculating method are the same as those of the first to the fourth embodiments, explanations thereof will be omitted.

According to at least one aspect of the embodiments and the like described above, it is possible to enhance the accuracy (the precision levels) of the calculated pH values.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

In relation to the embodiments and the like described above, the following notes are provided as certain aspects and selective characteristics of the present disclosure:

Note 1

A pH calculating apparatus including:
an obtaining unit configured to obtain at least one Z spectrum that is generated from a Chemical Exchange Saturation Transfer (CEST) imaging process by using, for an examined subject, a contrast agent containing a plurality of types of substances having mutually-different responsiveness to pH and that includes fall points or local minima of a plurality of signal values respectively corresponding to the plurality of types of substances and configured to obtain information related to the examined subject;
a calculating unit configured to calculate a pH dependent value by using a plurality of MR signal values corresponding to the fall points or the local minima of the plurality of signal values;
a selecting unit configured to select a standard curve indicating a pH value corresponding to the pH dependent value in accordance with the information related to the examined subject, from among a plurality of standard curves prepared in advance in accordance with the information related to the examined subject; and
a pH value determining unit configured to determine a pH value on the basis of the selected standard curve and the pH dependent value.

Note 2

The information related to the examined subject may be at least one of a $B_1$ map generated from an imaging process different from the CEST imaging process and a temperature of the examined subject.

Note 3

The calculating unit may be configured to calculate the pH dependent value, by using at least two of the plurality of MR signal values, and
the pH dependent value may include a ratio between the two MR signal values.

Note 4

The calculating unit may be configured to calculate the pH dependent value by using a ratiometric method.

Note 5

The Z spectrum may be represented by spectrum data obtained by correcting the position of a saturation pulse in the CEST imaging process on the basis of a $B_0$ map generated from an imaging process different from the CEST imaging process.

Note 6

The contrast agent may be one of iopamidol and iopromide.

Note 7

The plurality of standard curves may be represented by data calculated from a simulation or data obtained by interpolating actual measurement values.

Note 8

A magnetic resonance imaging apparatus comprising:
the pH calculating apparatus according to Note 1; and
a controlling unit configured to execute the CEST imaging process.

Note 9

A pH calculating method including:
obtaining at least one Z spectrum that is generated from a Chemical Exchange Saturation Transfer (CEST) imaging process by using, for an examined subject, a contrast agent containing a plurality of types of substances having mutually-different responsiveness to pH and that includes fall points or local minima of a plurality of signal values respectively corresponding to the plurality of types of substances, and also obtaining information related to the examined subject;
calculating a pH dependent value by using a plurality of MR signal values corresponding to the fall points or the local minima of the plurality of signal values;
selecting a standard curve indicating a pH value corresponding to the pH dependent value in accordance with the information related to the examined subject, from among a plurality of standard curves prepared in advance in accordance with the information related to the examined subject; and
determining a pH value on the basis of the selected standard curve and the pH dependent value.

What is claimed is:

1. A pH calculating apparatus, comprising:
processing circuitry configured to:
obtain at least one Z spectrum that is generated from a Chemical Exchange Saturation Transfer (CEST) imaging process by using, for an examined subject, a contrast agent containing a plurality of types of substances having mutually-different responsiveness to pH and that includes local minima of a plurality of signal values respectively corresponding to the plurality of types of substances, and also obtain information related to the examined subject;
calculate a pH dependent value by using a plurality of MR signal values corresponding to the local minima of the plurality of signal values;
select a standard curve indicating a pH value corresponding to the pH dependent value in accordance with the information related to the examined subject, from among a plurality of standard curves prepared in advance; and
determine a pH value based on the selected standard curve and the pH dependent value.

2. The pH calculating apparatus according to claim 1, wherein the information related to the examined subject is a Bj map generated from an imaging process different from the CEST imaging process.

3. The pH calculating apparatus according to claim 1, wherein the information related to the examined subject is a $B_1$ map generated from an imaging process different from the CEST imaging process and a temperature of the examined subject.

4. The pH calculating apparatus according to claim 1, wherein the information related to the examined subject is a temperature of the examined subject.

5. The pH calculating apparatus according to claim 1, wherein
the processing circuitry is further configured to calculate the pH dependent value, by using at least two of the plurality of MR signal values, and
the pH dependent value includes a ratio between two of the MR signal values.

6. The pH calculating apparatus according to claim 5, wherein the processing circuitry is further configured to calculate the pH dependent value by using a ratiometric method.

7. The pH calculating apparatus according to claim 1, wherein the Z spectrum is represented by spectrum data obtained by correcting a position of a saturation pulse in the CEST imaging process based on a $B_0$ map generated from an imaging process different from the CEST imaging process.

8. The pH calculating apparatus according to claim 1, wherein the contrast agent is one of iopamidol and iopromide.

9. The pH calculating apparatus according to claim 1, wherein the plurality of standard curves are represented by data calculated from a simulation or data obtained by interpolating actual measurement values.

10. The pH calculating apparatus according to claim 1, further comprising a memory to store the plurality of standard curves prepared in advance.

11. The pH calculating apparatus according to claim 1, wherein the plurality of standard curves prepared in advance are based on actual measurement values premeasured by using a phantom or data calculated from a simulation.

12. The pH calculating apparatus according to claim 1, wherein the plurality of types of substances are represented by two amide groups of the contrast agent.

13. A magnetic resonance imaging apparatus, comprising:
processing circuitry configured to
obtain at least one Z spectrum that is generated from a Chemical Exchange Saturation Transfer (CEST) imaging process by using, for an examined subject, a contrast agent containing a plurality of types of substances having mutually-different responsiveness to pH and that includes local minima of a plurality of signal values respectively corresponding to the plurality of types of substances, and to also obtain information related to the examined subject,
calculate a pH dependent value by using a plurality of MR signal values corresponding to the local minima of the plurality of signal values,
select a standard curve indicating a pH value corresponding to the pH dependent value in accordance with the information related to the examined subject, from among a plurality of standard curves prepared in advance, and
determine a pH value based on the selected standard curve and the pH dependent value; and
sequence controlling circuitry configured to execute the CEST imaging process.

14. A pH calculating method, comprising:
obtaining at least one Z spectrum that is generated from a Chemical Exchange Saturation Transfer (CEST) imaging process by using, for an examined subject, a contrast agent containing a plurality of types of substances having mutually-different responsiveness to pH and that includes local minima of a plurality of signal values respectively corresponding to the plurality of types of substances, and also obtaining information related to the examined subject;

calculating a pH dependent value by using a plurality of MR signal values corresponding to the local minima of the plurality of signal values;
selecting a standard curve indicating a pH value corresponding to the pH dependent value in accordance with the information related to the examined subject, from among a plurality of standard curves prepared in advance; and
determining a pH value on a basis of the selected standard curve and the pH dependent value.

* * * * *